APPARATUS FOR PERFORMING HIGH-SPEED DIVISION
Filed May 23, 1957 11 Sheets-Sheet 1
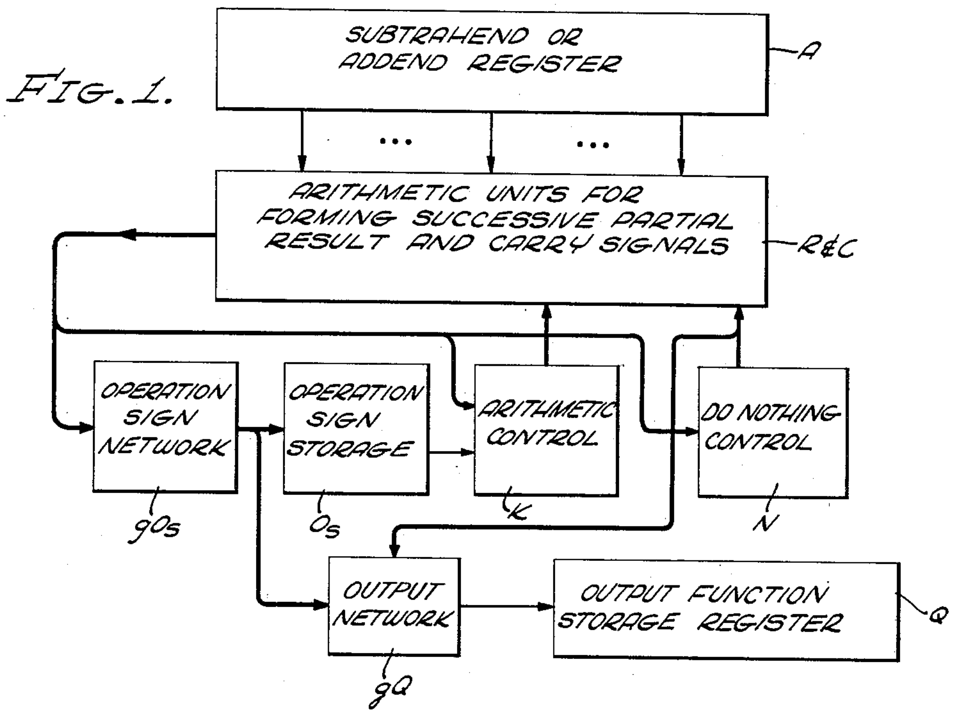
FIG. 1.
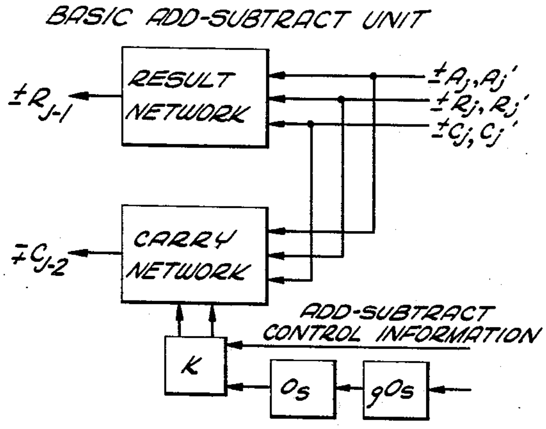
FIG. 2.
| | | | | |
|---|---|---|---|---|
| gOs | + | − | + | − |
| SIGN Rj | − | + | + | − |
| SIGN Cj | + | − | − | + |
| SIGN Rj-1 | − | + | − | + |
| SIGN Cj-2 AND Os | + | − | + | − |
FIG. 2a.
INVENTOR.
ROGER A. STAFFORD
BY ELWOOD S. KENDRICK
ATTORNEYS

ROGER A. STAFFORD
INVENTOR.
BY ELWOOD S. KENDRICK
ATTORNEYS

APPARATUS FOR PERFORMING HIGH-SPEED DIVISION

Filed May 23, 1957 11 Sheets-Sheet 3

INVENTOR.
ROGER A. STAFFORD
BY ELWOOD S. KENDRICK
ATTORNEYS

| | | | | | | | | | | | | | |
|---|---|---|---|---|---|---|---|---|---|---|---|---|---|
| | | | | | +4 | 0 | 0 | -4 | +4 | 0 | 0 | -4 | |
| | | | | | - | - | - | - | + | + | + | + | Os |
| | | | | | + | + | - | - | + | + | - | - | Coo |
| | Ro | Co | R1 | C1 | 1 | 0 | 0 | 1 | 1 | 0 | 0 | 1 | Roo |
| (+3) | 1 | 0 | 1 | 0 | +7 | +3 | +3 | -1 | +1 | -3 | -3 | -7 | (-3) |
| (+2) | 1 | 0 | 0 | 0 | +6 | +2 | +2 | -2 | +2 | -2 | -2 | -6 | (-2) |
| (+2) | 1 | 0 | 1 | 1 | +6 | +2 | +2 | -2 | +2 | -2 | -2 | -6 | (-2) |
| (+1) | 0 | 0 | 1 | 0 | +5 | +1 | +1 | -3 | +3 | -1 | -1 | -5 | (-1) |
| (+1) | 1 | 0 | 0 | 1 | +5 | +1 | +1 | -3 | +3 | -1 | -1 | -5 | (-1) |
| (+1) | 1 | 1 | 1 | 0 | +5 | +1 | +1 | -3 | +3 | -1 | -1 | -5 | (-1) |
| (0) | 0 | 0 | 0 | 0 | +4 | 0 | 0 | -4 | +4 | 0 | 0 | -4 | (0) |
| (0) | 0 | 0 | 1 | 1 | +4 | 0 | 0 | -4 | +4 | 0 | 0 | -4 | (0) |
| (0) | 1 | 1 | 0 | 0 | +4 | 0 | 0 | -4 | +4 | 0 | 0 | -4 | (0) |
| (0) | 1 | 1 | 1 | 1 | +4 | 0 | 0 | -4 | +4 | 0 | 0 | -4 | (0) |
| (-1) | 0 | 0 | 0 | 1 | +3 | -1 | -1 | -5 | +5 | +1 | +1 | -3 | (+1) |
| (-1) | 0 | 1 | 1 | 0 | +3 | -1 | -1 | -5 | +5 | +1 | +1 | -3 | (+1) |
| (-1) | 1 | 1 | 0 | 1 | +3 | -1 | -1 | -5 | +5 | +1 | +1 | -3 | (+1) |
| (-2) | 0 | 1 | 0 | 0 | +2 | -2 | -2 | -6 | +6 | +2 | +2 | -2 | (+2) |
| (-2) | 0 | 1 | 1 | 1 | +2 | -2 | -2 | -6 | +6 | +2 | +2 | -2 | (+2) |
| (-3) | 0 | 1 | 0 | 1 | +1 | -3 | -3 | -7 | +7 | +3 | +3 | -1 | (+3) |

FIG. 6.

INVENTOR.
ROGER A. STAFFORD
BY ELWOOD S. KENDRICK
ATTORNEYS

INVENTOR.
ROGER A. STAFFORD

BY ELWOOD S. KENDRICK
Lester S. Hecht
ATTORNEYS

ROGER A. STAFFORD
INVENTOR.
BY ELWOOD S. KENDRICK
Lester S. Hecht
ATTORNEYS

APPARATUS FOR PERFORMING HIGH-SPEED DIVISION

Filed May 23, 1957

ROGER A. STAFFORD
INVENTOR.

BY ELWOOD S. KENDRICK

ATTORNEYS

FIG. 12.

| +Os | -Os | Ro Co R1 C1 | | | | | | | | |
|---|---|---|---|---|---|---|---|---|---|---|
| | | N | 0 0 0 0 | 0 0 0 0 | 0 0 0 0 | 0 0 0 0 | 1 1 1 1 | 1 1 1 1 | 1 1 1 1 | 1 1 1 1 |
| | | gOs | + + + + | - - - - | - - - - | + + + + | + + + + | - - - - | - - - - | + + + + |
| | | Os | - - - - | + + + + | - - - - | + + + + | - - - - | + + + + | - - - - | + + + + |
| | | K | 0 0 0 0 | 0 0 0 0 | 1 1 1 1 | 1 1 1 1 | 0 0 0 0 | 0 0 0 0 | 1 1 1 1 | 1 1 1 1 |
| | | Coo | + - + - | + - + - | + - + - | + - + - | + - + - | + - + - | + - + - | + - + - |
| | | Roo | 1 1 0 0 | 0 0 1 1 | 1 1 0 0 | 0 0 1 1 | 1 1 0 0 | 0 0 1 1 | 1 1 0 0 | 0 0 1 1 |
| − | +3 | 1 0 1 0 | +4 0 +2+2 | -2-2 0-4 | +3-1 +1+1 | -1-1 +1-3 | +3-1 +1+1 | -1-1 +1-3 | +3-1 +1+1 | -1-1 +1-3 |
| − | +2 | 1 0 0 0 | +4 0 +2+2 | -2-2 0-4 | +2-2 0 0 | 0 0 +2-2 | +3-1 +1+1 | -1-1 +1-3 | +3-1 +1+1 | -1-1 +1-3 |
| | | 1 0 1 1 | +4 0 +2+2 | -2-2 0-4 | +2-2 0 0 | 0 0 +2-2 | +3-1 +1+1 | -1-1 +1-3 | +3-1 +1+1 | -1-1 +1-3 |
| − | +1 | 0 0 1 0 | +3-1 +1+1 | -1-1 +1-3 | +2-2 0 0 | 0 0 +2-2 | +2-2 0 0 | 0 0 +2-2 | +2-2 0 0 | 0 0 +2-2 |
| | | 1 0 0 1 | +3-1 +1+1 | -1-1 +1-3 | +2-2 0 0 | 0 0 +2-2 | +3-1 +1+1 | -1-1 +1-3 | +3-1 +1+1 | -1-1 +1-3 |
| | | 1 1 1 0 | +3-1 +1+1 | -1-1 +1-3 | +2-2 0 0 | 0 0 +2-2 | +2-2 0 0 | 0 0 +2-2 | +2-2 0 0 | 0 0 +2-2 |
| | 0 | 0 0 0 0 | +3-1 +1+1 | -1-1 +1-3 | +1-3 -1-1 | +1+1 +3-1 | +2-2 0 0 | 0 0 +2-2 | +2-2 0 0 | 0 0 +2-2 |
| | | 0 0 1 1 | +3-1 +1+1 | -1-1 +1-3 | +1-3 -1-1 | +1+1 +3-1 | +2-2 0 0 | 0 0 +2-2 | +2-2 0 0 | 0 0 +2-2 |
| | | 1 1 0 0 | +3-1 +1+1 | -1-1 +1-3 | +1-3 -1-1 | +1+1 +3-1 | +2-2 0 0 | 0 0 +2-2 | +2-2 0 0 | 0 0 +2-2 |
| | | 1 1 1 1 | +3-1 +1+1 | -1-1 +1-3 | +1-3 -1-1 | +1+1 +3-1 | +2-2 0 0 | 0 0 +2-2 | +2-2 0 0 | 0 0 +2-2 |
| + | -1 | 0 0 0 1 | +2-2 0 0 | 0 0 +2-2 | +1-3 -1-1 | +1+1 +3-1 | +2-2 0 0 | 0 0 +2-2 | +2-2 0 0 | 0 0 +2-2 |
| | | 0 1 1 0 | +2-2 0 0 | 0 0 +2-2 | +1-3 -1-1 | +1+1 +3-1 | +1-3 -1-1 | +1+1 +3-1 | +1-3 -1-1 | +1+1 +3-1 |
| | | 1 1 0 1 | +2-2 0 0 | 0 0 +2-2 | +1-3 -1-1 | +1+1 +3-1 | +2-2 0 0 | 0 0 +2-2 | +2-2 0 0 | 0 0 +2-2 |
| + | -2 | 0 1 0 0 | +2-2 0 0 | 0 0 +2-2 | 0-4 -2-2 | +2+2 +4 0 | +1-3 -1-1 | +1+1 +3-1 | +1-3 -1-1 | +1+1 +3-1 |
| | | 0 1 1 1 | +2-2 0 0 | 0 0 +2-2 | 0-4 -2-2 | +2+2 +4 0 | +1-3 -1-1 | +1+1 +3-1 | +1-3 -1-1 | +1+1 +3-1 |
| + | -3 | 0 1 0 1 | +1-3 -1-1 | +1+1 +3-1 | 0-4 -2-2 | +2+2 +4 0 | +1-3 -1-1 | +1+1 +3-1 | +1-3 -1-1 | +1+1 +3-1 |

INVENTOR.
ROGER A. STAFFORD
BY ELWOOD S. KENDRICK
ATTORNEYS

INVENTOR.
ROGER A. STAFFORD
BY ELWOOD S. KENDRICK
[signature]
ATTORNEYS

March 6, 1962 R. A. STAFFORD 3,023,961

APPARATUS FOR PERFORMING HIGH-SPEED DIVISION

Filed May 23, 1957 11 Sheets-Sheet 10

INVENTOR.
ROGER A. STAFFORD

BY ELWOOD S. KENDRICK
Lester S. Hecht
ATTORNEYS

March 6, 1962 R. A. STAFFORD 3,023,961

APPARATUS FOR PERFORMING HIGH-SPEED DIVISION

Filed May 23, 1957 11 Sheets-Sheet 11

ROGER A. STAFFORD
INVENTOR.

BY ELWOO S. KENDRICK

ATTORNEYS

United States Patent Office 3,023,961
Patented Mar. 6, 1962

3,023,961

APPARATUS FOR PERFORMING HIGH-SPEED DIVISION

Roger A. Stafford, Champaign, Ill., assignor, by mesne assignments, to Thompson Ramo Wooldridge Inc., Cleveland, Ohio, a corporation of Ohio Filed May 23, 1957, Ser. No. 661,157
17 Claims. (Cl. 235—164)

This invention relates to a method and apparatus for performing high-speed division, square root, and other similar operations and, more particularly, to a technique for forming a quotient, root, or other output number having $n$ digits during $n$ successive digit time intervals. In further particular, the invention provides a system wherein a succession of remainders of binary numbers are formed by combining an input operand, such as a divisor, root subtrahend, or other fixed or variable number, by addition and subtraction with the present remainder to form the next remainder whenever a predetermined set of the most significant digits thereof indicate that the next remainder to be formed will have an absolute value less than twice that of the next operand and by doing nothing to the remainder to form the next remainder whenever the predetermined set of digits do not indicate the expected magnitude of the next remainder; positive, negative, and zero output digits being formed during the operations of subtraction, addition, and doing nothing, respectively.

The present invention employs, as a preferred part thereof, the arithmetic unit described and claimed in copending application for "Serial-Parallel Arithmetic Units Without Cascaded Carries" by Roger A. Stafford, Serial No. 661,158 filed May 23, 1957. This arithmetic unit will be also described herein with particular reference to the utilization thereof in a division system, reference for other variations in the form of the unit and other uses thereof being made to the above-mentioned copending application.

According to the basic concept of the copending application, an improved technique for accumulating binary digits without cascading carries, allowing the operation upon input numbers of varying sign by either addition or subtraction, is accomplished by forming partial result and carry signals of opposite signs, the carry signals being assumed to bear the sign of the operation. The operation sign, as defined in the copending application and as referred to herein, is considered to include the sign of the input number as well as the particular operation of addition or subtraction. It will be understood hereafter that an operation sign of plus may occur either when the negative input number is subtracted or when a positive input number is added, assuming that the number appears as an absolute value plus sign.

It is established in the copending application that once partial result and carry signals are generated with opposite signs, the carry signal bearing the sign of the operation, all subsequent result and carry digits will bear opposite signs and the carry signs will always be known as a function of the previous operation sign. This technique, then, makes it possible to perform a succession of accumulations where the carry signals are not cascaded, yet without the necessity of carrying individual signs for the various carry signals.

In accumulating a series of numbers in the typical prior art system, the time required is a function of the length of the number of digits in a number as well as the number of numbers to be accumulated. This may be expressed as K$nm$, where K is a constant, $n$ is the digits per number, and $m$ is the number of numbers. It will be shown, however, that according to the present invention the same accumulation processes are performed only as a function of the number of numbers to be accumulated, plus the time required to combine the final partial result and carry signals. In other words, the operation time is a function of "$m$" plus a constant.

The limitation of the prior art cascading is even more pronounced when the operations of multiplication and especially division are considered. Specifically, in either of these cases, $m$ becomes equal to $n$. Thus the time required to multiply or to divide becomes proportional to $n^2$ because these operations are performed as many times as there are digits in a number to be operated upon.

While the method of the copending application permits the high-speed accumulation of input numbers in the manner indicated above, it presents several problems with respect to the decision logic required for operations such as division or square root. In these situations, the partial remainder would have to be examined in its entirety in order to determine the sign thereof to perform the computation in the conventional manner. In non-restoring division, for example, the divisor is subtracted from the entire partial remainder if it is positive and is added to the partial remainder if it is negative, positive and negative output digits being formed for positive and negative remainders, respectively.

But the high-speed accumulation technique of the copending application does not provide a complete remainder since the result and carry digits exist as separate series. This means that situations may arise where the detection of a negative remainder would require the analysis of each and every result and carry digit in the accumulator register. This problem, of course, does not arise in the lower-speed accumulator register since in this case the most significant remainder digit represents the sign of the total remainder. It is evident that the detection of the various combinations of all of the result and carry digits in the accumulator register of the copending application would require an extremely complicated logical network. Furthermore, the complexity of the network would increase as the number of significant digits of the numbers involved was increased.

The present invention, however, obviates the necessity of examining all of the partial result and carry digits in the remainder register in providing a novel method for division, square root, and other similar operations. In accordance with the basic method of the invention, a predetermined set of the most significant result and carry digits of each partial remainder are examined to provide an indication of the algebraic magnitude of the total remainder. The set remains the same for any length of remainder. If this set indicates that the remainder is positive, subtraction is performed and a positive output digit is produced. If the set indicates a negative remainder, addition is performed and a negative output digit is produced. Finally, a "do nothing" operation is provided when the sign of the remainder cannot be detected in the predetermined set of digits. This may be considered to occur when the predetermined set of digits represents all zeros in the most significant portion of the remainder. During the "do nothing" operation, an output digit of zero is formed and the partial remainder is left unchanged.

As explained previously, the speed of conventional dividers is proportional to $n^2$. However, it will be noted that the speed of the apparatus of the invention is only a linear function of $n$. As a practical matter, the decision logic may be substantially reduced as indicated above so that the invention may be mechanized with the same or less circuit structure than those of the prior art.

Accordingly, it is an object of the present invention to provide a simple effective method of utilizing a register to perform such operations as division and square root without a complex decision logic being required to examine the partial result and carry digits therein, and without cascaded carries.

Another object is to provide a high-speed system for forming *n* output digits during *n* successive digit time intervals, the output digits being defined as a function of the algebraic magnitude of a partial remainder, simplicity being accomplished by examining only a predetermined set of the most significant digits in the partial remainder which is independent of the word length.

A further object is to provide an improved method for performing division or square root through the utilization of a high-speed accumulator register forming separate series of partial result and carry digits whereby only a few of the most significant digits in the accumulator register must be examined in order to determine successive operations and output digits.

Yet a further object of the invention is to simplify the decision logic required to form a succession of partial remainders in a system utilizing an accumulator register having separate result and carry signals of opposite signs by performing three basic operations of addition, subtraction, and do nothing, each operation being specified as a function of a predetermined set of the most significant digits in the accumulator register.

A more specific object of the invention is to provide a network for entering the sign and complete result digit into the most significant digit position of an accumulator register in order to simplify the decision logic required in formulating operation signals designating addition, subtraction, and do nothing.

Another specific object of the invention is to provide relatively simple networks for generating signals representing operations of addition, subtraction, and do nothing.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only and are not intended as a definition of the limits of the invention.

FIG. 1 is a block diagram indicating the general form of a system embodying the principles of the present invention;

FIG. 2 is a block diagram of the basic arithmetic unit utilized in the accumulator register of systems employing the present invention;

Figure 3:
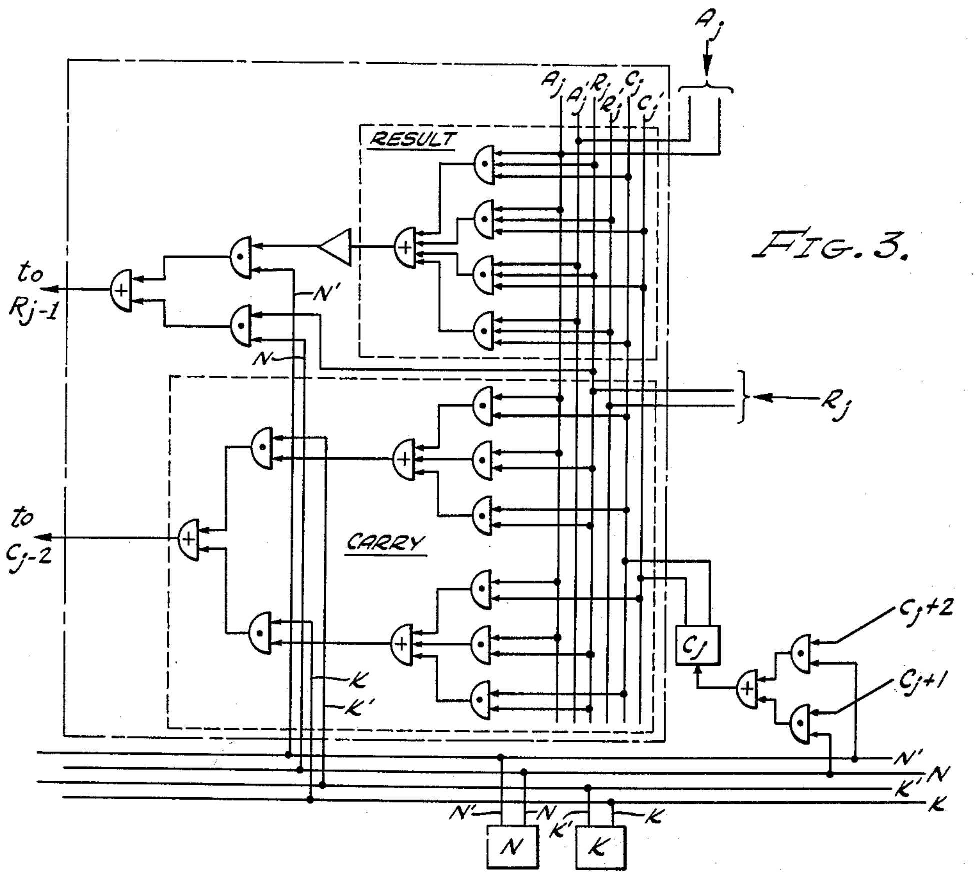
Figure 9:
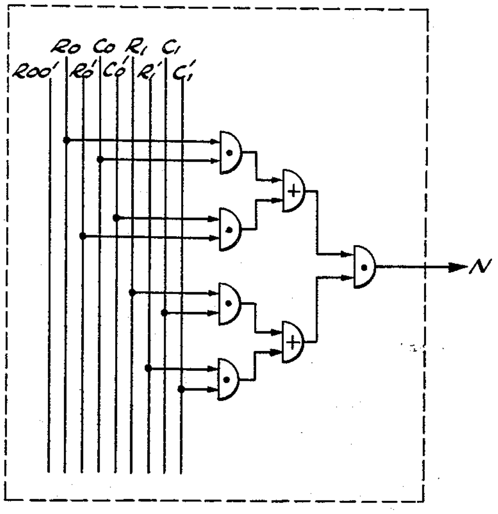
Figure 4:
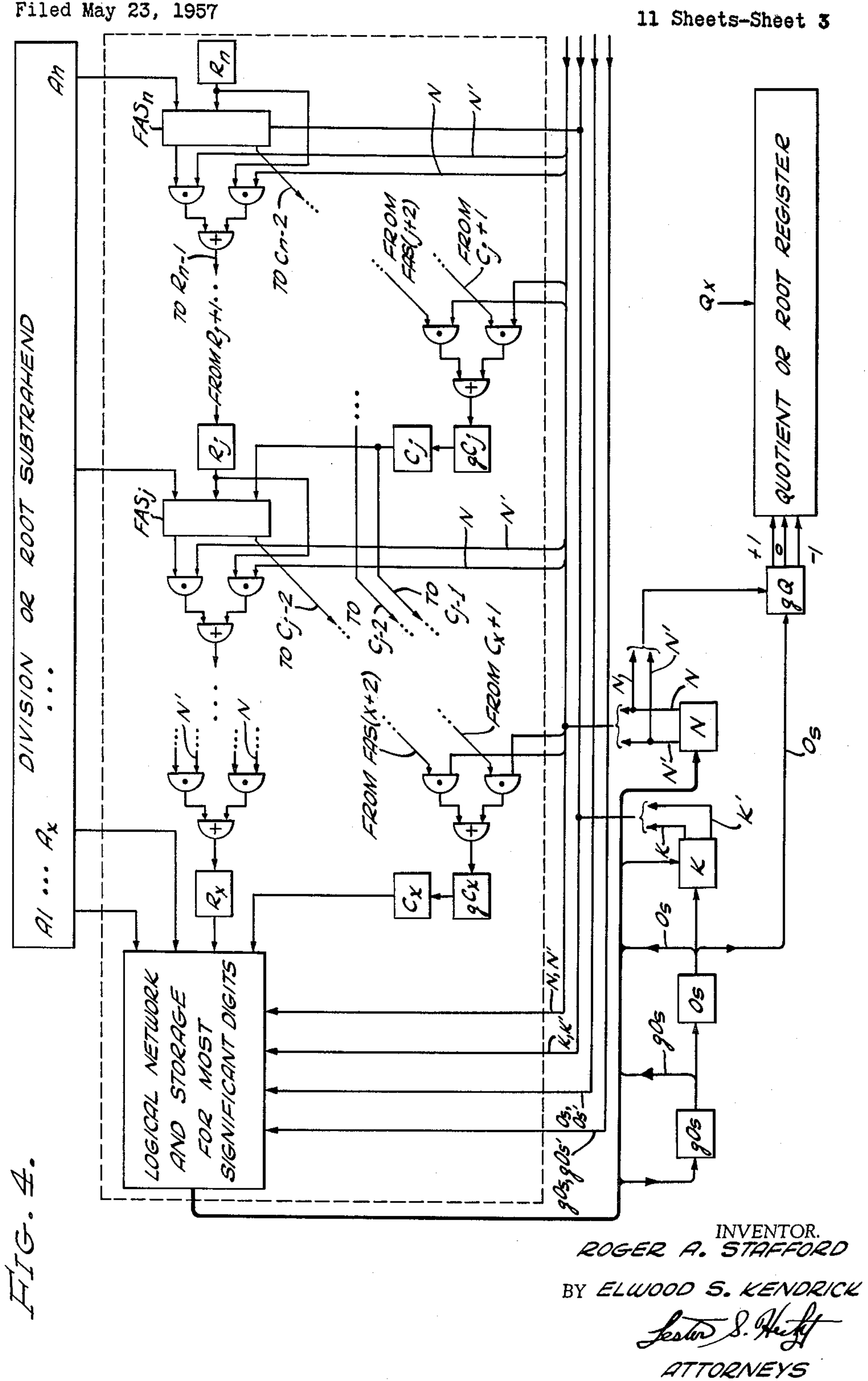
Figure 8:
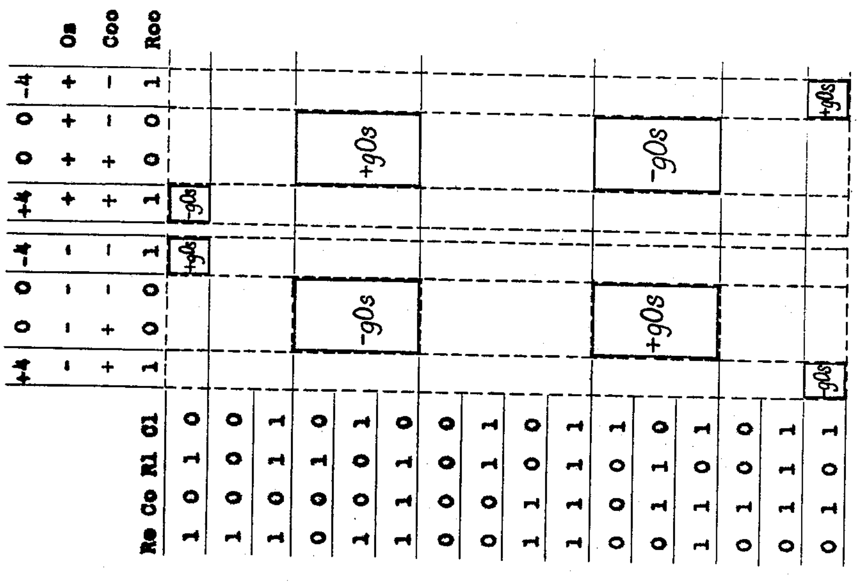
Figure 7:
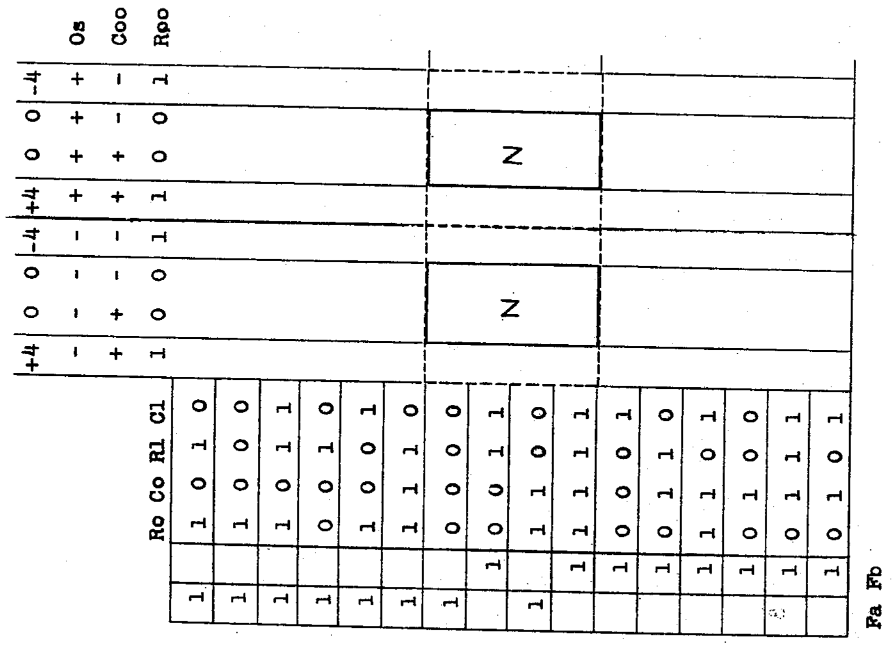
Figure 5A:
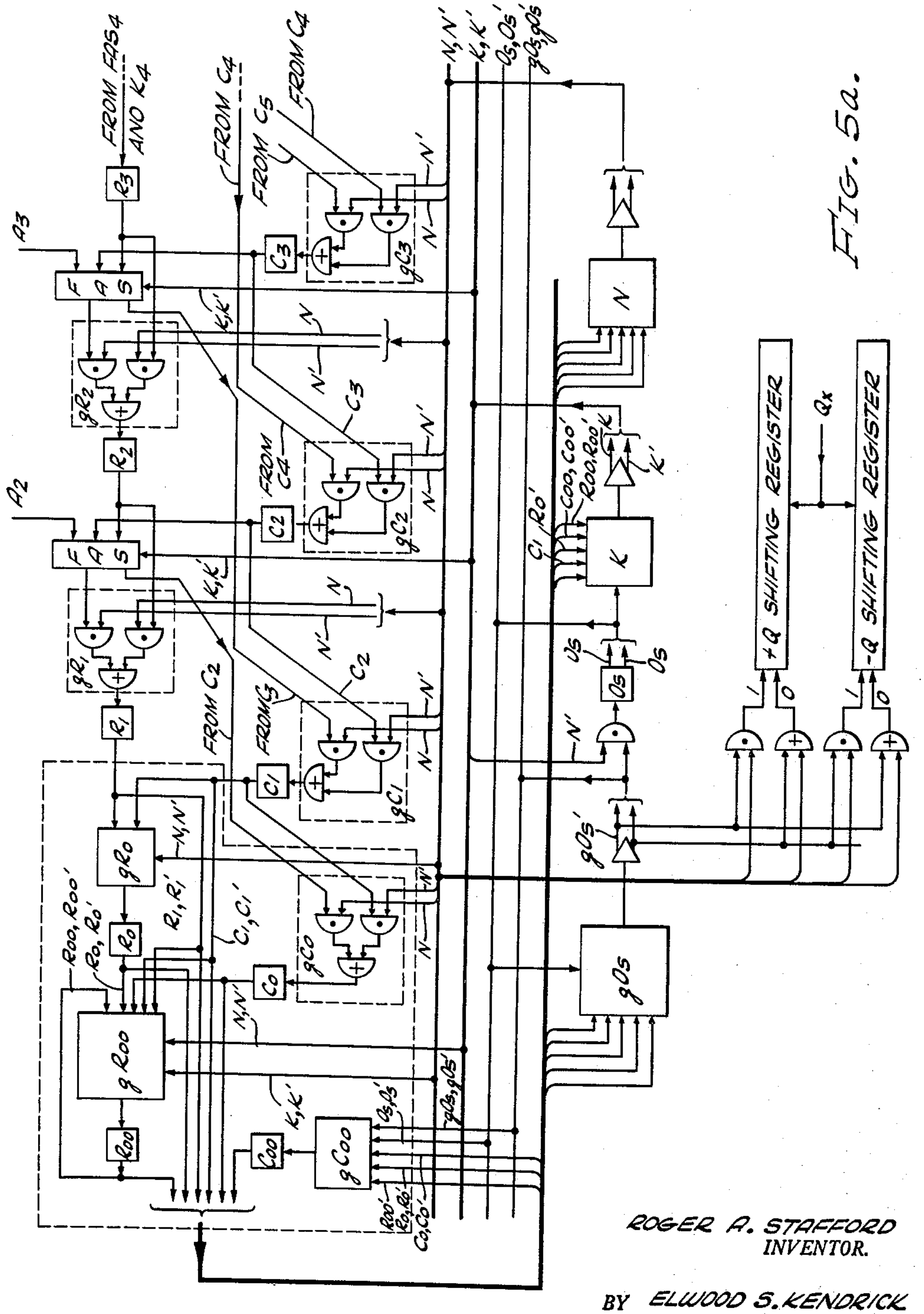
Figure 5B:
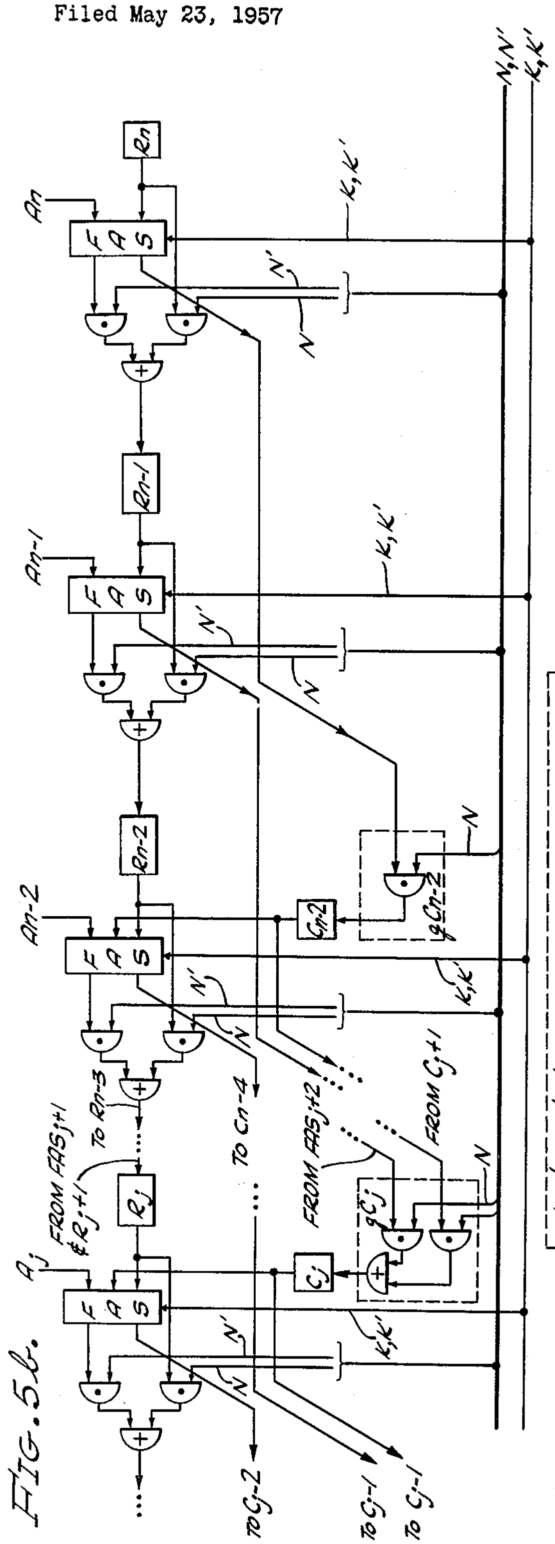
Figure 11:
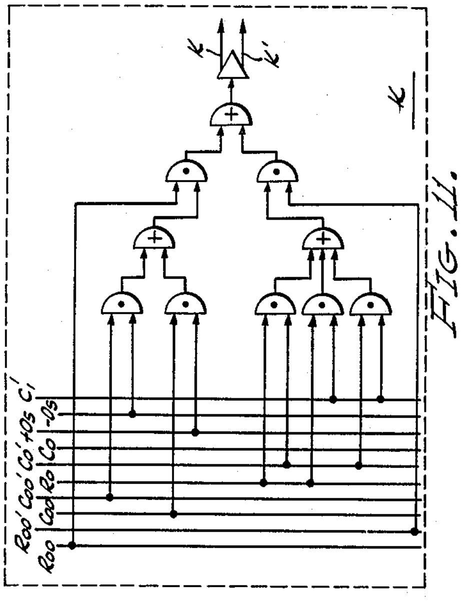
Figure 10:
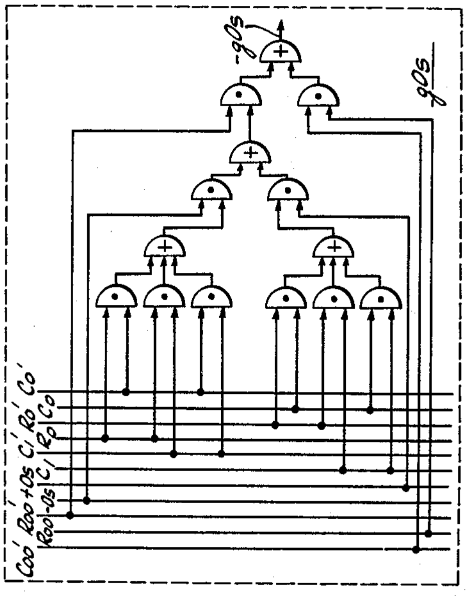
Figure 13:
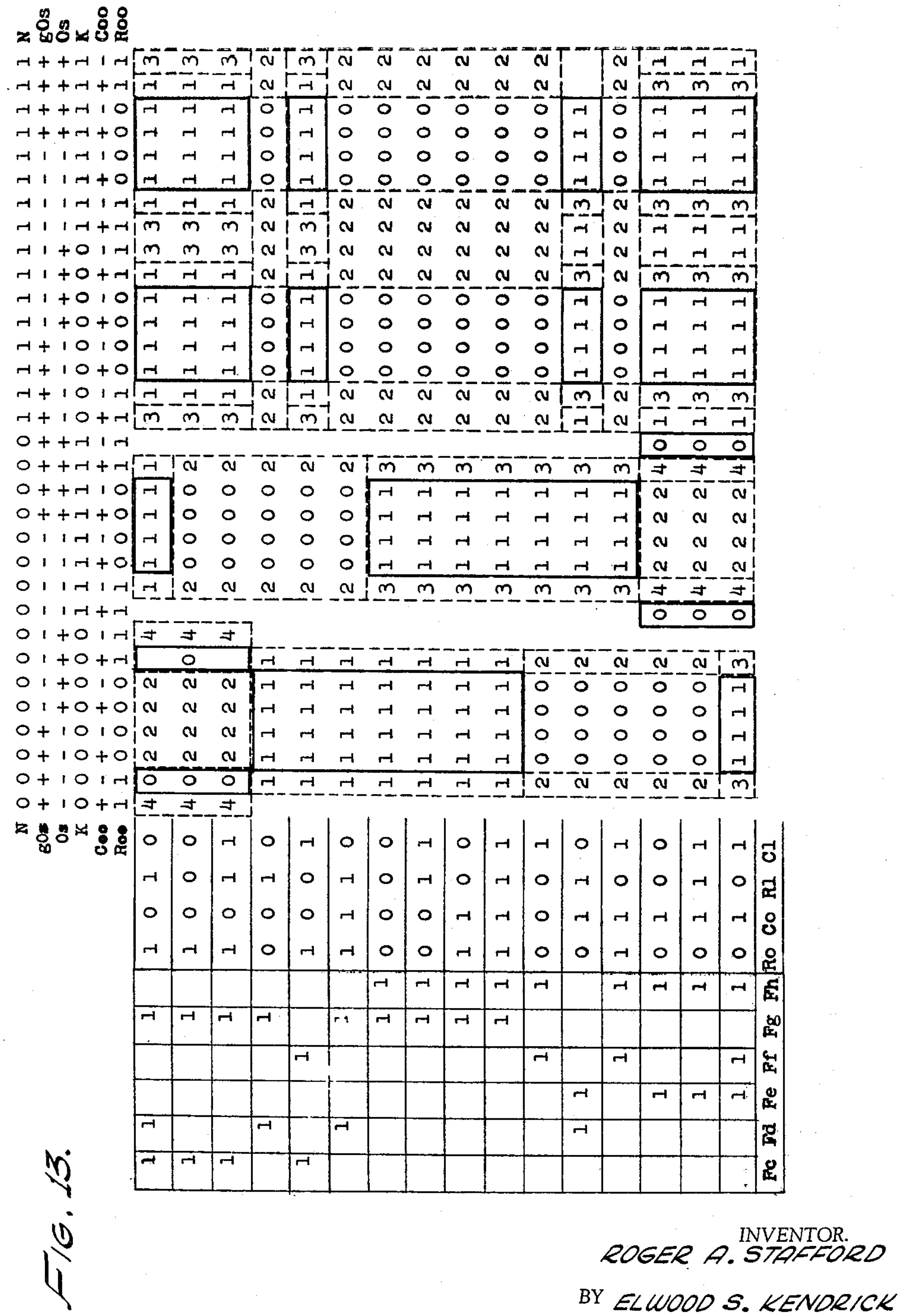
Figure 14:
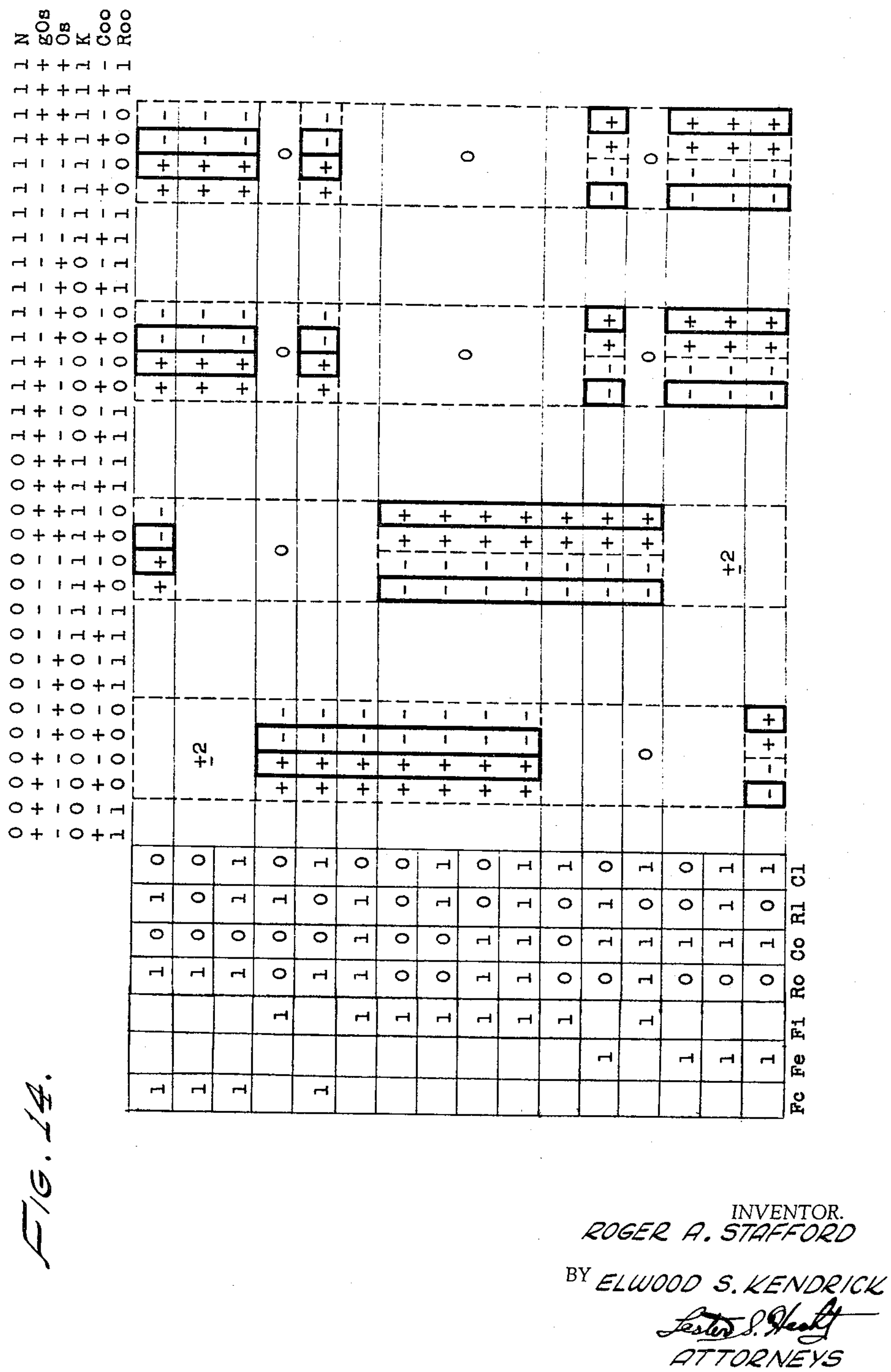
Figure 15:
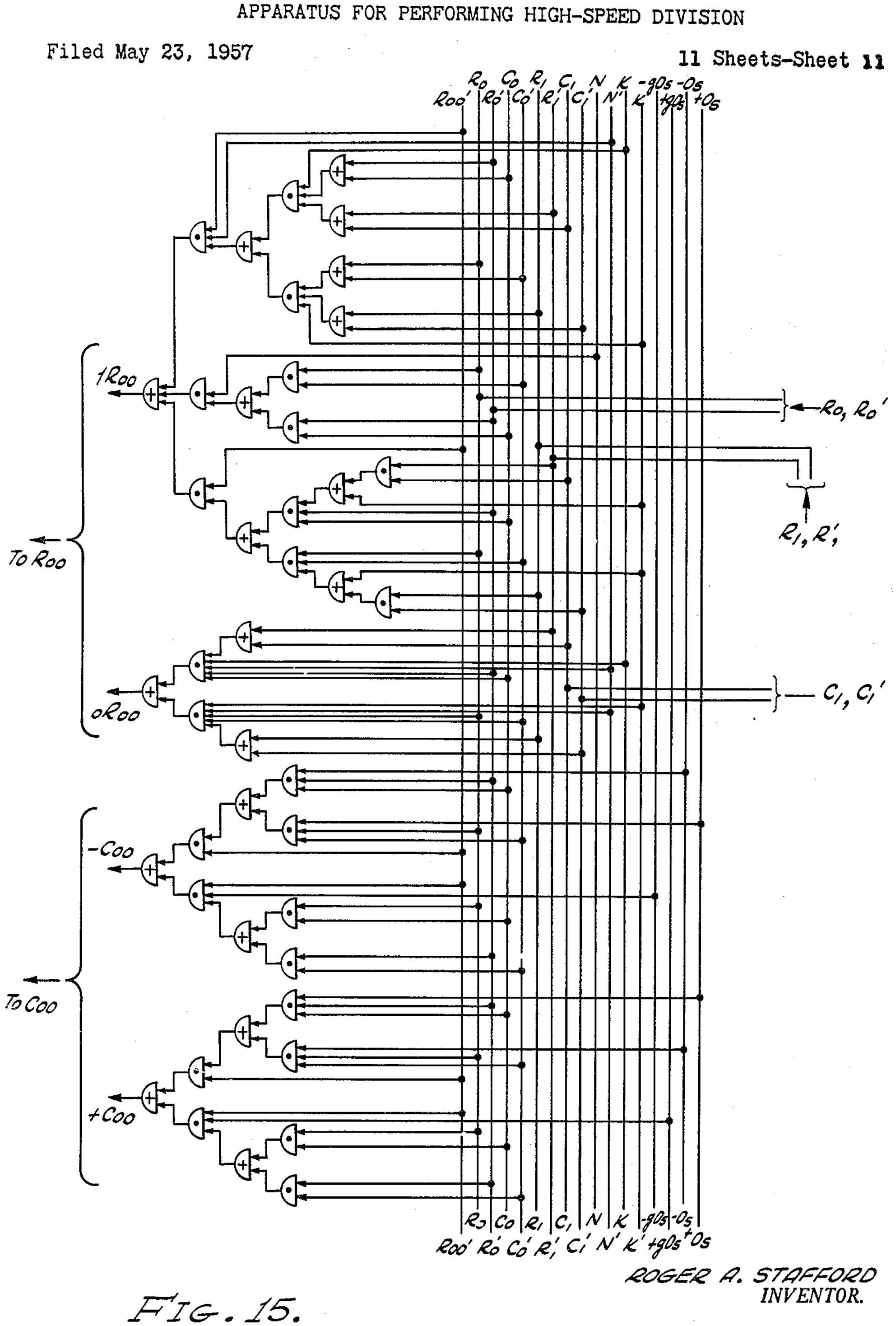

FIG. 2*a* is a chart illustrating the sign considerations involved in forming the partial result and carry digits when utilizing the arithmetic unit of FIG. 2;

FIG. 3 is a schematic diagram of one form of arithmetic unit which may be utilized in the division system of the invention;

FIG. 4 illustrates a block diagram of one form of division system embodying the present invention;

FIGS. 5*a* and 5*b* taken together constitute a schematic diagram illustrating in further detail a particular division system embodying the present invention;

FIG. 6 is a chart or "truth table" indicating the decision selections which may occur for various combinations of a predetermined set of the most significant digits in the remainder register;

FIG. 7 is a chart indicating the areas of the chart of FIG. 6 where the do nothing operation is performed;

FIG. 8 is a chart indicating the areas where operation sign signals $+gOs$ and $-gOs$ are generated;

FIG. 9 is a schematic diagram of a network suitable for producing control signals N and N';

FIG. 10 is a schematic diagram of one network suitable for producing operation sign signals $-gOs$ and $+gOs$;

FIG. 11 is a schematic diagram of a network suitable for producing control signals K and K';

FIG. 12 is a chart indicating the basic decision considerations involved in forming the most significant complete result digit R*oo* and the sign digit C*oo*;

FIG. 13 is a chart showing the areas where signal R*oo* has values of one and zero;

FIG. 14 is a chart showing the areas where signal C*oo* represents plus and minus signs;

FIG. 15 is a schematic diagram of a suitable network for producing input signals representing a most significant digit R*oo* representing a complete result digit and for producing a sign signal C*oo* representing the sign of digit R*oo*.

Referring now to FIG. 1, it will be noted that the signals of a subtrahend or addend stored in a register A are applied to a series of arithmetic units for forming successive partial result and carry signals, referred to as devices R and C. A predetermined set of the arithmetic units of devices R and C are examined in order to determine the approximate algebraic magnitude of the remainder therein and these signals are applied to a plurality of control networks. A network $gOs$ is shown for forming operation sign signals $+gOs$ and $-gOs$ representing positive and negative operation signs, these signals being entered into an operation sign storage device O*s* producing corresponding output signals $+Os$ and $-Os$. The signals of device O*s* are applied to an arithmetic control device K which also may receive certain signals from the most significant arithmetic unit of devices R and C. Device K controls the operation of the carry networks in a predetermined manner as will be discussed below. Finally, a do nothing control signal N is provided for shifting the partial remainders in devices R and C without modification whenever the examination of the most significant digits therein does not indicate the sign of the remainder.

The operation sign signals are applied to an output network $gQ$ coupled to an output function storage register Q, network $gQ$ also receiving control signal N. In its general function network $gQ$ produces plus, minus, and zero signals in response to signals $+gOs$, $-gOs$, and N representing operations of addition, subtraction, and do nothing respectively.

Before proceeding, it is important that the basic operation of the arithmetic unit of the copending application be understood. Accordingly, the preliminary discussion here relates to the manner in which this unit is employed in an operation such as division, reference now being made for the following discussion to FIGS. 2 and 2*a*.

Referring now to FIG. 2, it will be noted that each unit receives signals $Aj$, $Rj$, and $Cj$, and produces output signals $Rj-1$ and $Cj-2$. The letter "$j$" is employed to designate the digital position of the respective signals applied, as well as those signals which are produced. That is, if the input signals represent a ten binary digit number, then "$j$" may have a value from one to ten. It is assumed as a convention herein that the decreasing values of $j$ occur in the direction of increasing digit significance. Thus signal $Rj-1$ is entered into a digit position one place higher than the input signals applied to the unit which produces it. In a similar manner, the carry signal $Cj-2$ is shifted ahead two digit positions. In terms of the complete remainder during a division operation, the shifting ahead of digits $Rj-1$ and $Cj-2$ constitutes an effective shift of the entire remainder one digital position in the direction of increasing significance with respect to the divisor in the A register.

In accordance with the basic concept of the above-identified copending application, signals $Rj-1$ and $Cj-2$ are produced with digit values corresponding to opposite signs, the carry signal $Cj-2$ bearing the sign of the operation represented by $gOs$ and having a weight of two relative to a weight of one for the result signal $Rj-1$. As indicated in FIG. 2a, only four sign possibilities are present because the invention requires that Cj—2 must be generated with a digit value to represent previous digit values based on the sign of the carry signal Cj—2 being the same sign as that of the operation. Further, in accordance with the invention of the above-identified co-pending application, the signs of the previous result and carry signals Rj and Cj, respectively, must be opposite. This means that only four sign possibilities in the input signals are alowed since four occur when the previous result and carry signals Rj and Cj, respectively, have the same signs.

It will be noted in FIG. 2a that whenever the operation sign gOs is positive, the new carry signal Cj—2 must also be positive and consequently the new result signal Rj—1 is negative; whereas whenever the operation signal gOs is negative, the new carry signal Cj—2 becomes negative and the new result signal Rj—1 is positive.

It will be noted that the sign possibilities shown in FIG. 2a are broken into two groups, namely, those in which the sign of the previous carry and the previous operation sign are the same, and those in which the sign of the previous carry and the present operation sign are different. It will be noted that where the previous carry and input signals have the same sign, the control signal K may be equal to 1, whereas the previous carry and input signals will have different signs when the control signal K is equal to 0.

The sign combinations of the input signals as well as the logical definition of the output signals in terms of binary variables may be most conveniently made by reference to Table I below.

and gOs are the same; that is, they are either both plus or both minus.

In the section where K=0, two sign combinations (3) and (4) are noted as: + + − − + and: − − + + −; for signals gOs, Rj, Cj, Rj−1, and Cj−1. In this situation the signs of Cj and gOs are noted to be opposite. In all cases, whether K=1 or K=0, it will be noted that the invention specifies signals Rj and Cj to be of opposite signs as are also output signals Rj−1 and Cj−2. This arrangement is fundamental to the invention.

Table I represents all possible binary combinations of the input signals Aj, Rj, and Cj. In this sense it may be referred to as a "truth table." This table will be considered hereafter as a basic reference for determining the value of binary output digits according to the invention, in the examples which follow. The table has been developed by combining the binary input digits according to their weight and sign in order to develop a total weight for the output digits Rj−1 and Cj−2. Consider, for example, the section of Table I where K=1 and where sign combinations in group (1) are employed. In row (1) the total value is 0 since all input signals Aj, Rj, and Cj are 0 and thus the output signals Rj−1 and Cj−2 are 0. In this case the signs are not designated. In row (2) only signal Cj has a value of binary 1. Reference to sign column (1) indicates that the sign of Cj is plus so that the total value is designated as +1 for sign combinations (1). If the sign combination of group (2) is considered, the sign of the total value of 1 is negative. When K=1 it will be noted that signals Rj−1 and Cj−2 bear the signs of signals Rj and Cj, respectively, for both combinations of signs.

TABLE I

K=1

| | Signs (1) | Signs (2) | Total value | Digit values: Aj | Rj | Cj | Rj−1 | Cj−2 | Signs (1) | Signs (2) | Total value |
|---|---|---|---|---|---|---|---|---|---|---|---|
| | gOs + Rj − Cj + | − + − | | | | | | | − + | + Rj−1 − Cj−2 | |
| (1) | ---- | ---- | 0 | 0 | 0 | 0 | 0 | 0 | ---- | ---- | 0 |
| (2) | + | − | 1 | 0 | 0 | 1 | 1 | 1 | + | − | 1 |
| (3) | − | + | 1 | 0 | 1 | 0 | 1 | 0 | − | + | 1 |
| (4) | ---- | ---- | 0 | 0 | 1 | 1 | 0 | 0 | ---- | ---- | 0 |
| (5) | + | − | 1 | 1 | 0 | 0 | 1 | 1 | + | − | 1 |
| (6) | + | − | 2 | 1 | 0 | 1 | 0 | 1 | + | − | 2 |
| (7) | ---- | ---- | 0 | 1 | 1 | 0 | 0 | 0 | ---- | ---- | 0 |
| (8) | + | − | 1 | 1 | 1 | 1 | 1 | 1 | + | − | 1 |

K=0

| | Signs (3) | Signs (4) | Total value | Digit values: Aj | Rj | Cj | Rj−1 | Cj−2 | Signs (3) | Signs (4) | Total value |
|---|---|---|---|---|---|---|---|---|---|---|---|
| | gOs + Rj + Cj − | − − + | | | | | | | − + | + Rj−1 − Cj−2 | |
| (1) | ---- | ---- | 0 | 0 | 0 | 0 | 0 | 0 | ---- | ---- | 0 |
| (2) | − | + | 1 | 0 | 0 | 0 | 1 | 0 | − | + | 1 |
| (3) | + | − | 1 | 0 | 1 | 1 | 1 | 1 | + | − | 1 |
| (4) | ---- | ---- | 0 | 0 | 1 | 1 | 0 | 0 | ---- | ---- | 0 |
| (5) | + | − | 1 | 1 | 0 | 0 | 1 | 1 | + | − | 1 |
| (6) | ---- | ---- | 0 | 1 | 0 | 0 | 0 | 0 | ---- | ---- | 0 |
| (7) | + | − | 2 | 1 | 1 | 1 | 0 | 1 | + | − | 2 |
| (8) | + | − | 1 | 1 | 1 | 1 | 1 | 1 | + | − | 1 |

It will be noted that Table I is divided into two sections designated by K=1 and K=0, respectively. In the section where K=1 two sign combinations designated as (1) and (2) are noted to be specified. In sign combination (1) the signals gOs, Rj, Cj, Rj−1, and Cj−2 have the following signs: + − + − +. In sign combination (2) these signals have the signs: − + − + −. It will be noted that the situation K=1 occurs when the signs of Cj The value of output digits Rj−1 and Cj−2 may be determined by observing the sign of the input signals which correspond to the total value. For example, in row (2) the signs + — appear for the total value of binary 1 for sign combinations (1) and (2), respectively. These signs correspond to the sign of Cj which is the same as the new sign for Cj—2. This means that in order to obtain a total value of 1 for the particular combination of input signals it is necessary to generate both a carry signal, which has a weight of 2 and a result signal which has a weight of 1. In other words, for sign combination (1) output signals $Rj-1$ and $Cj-2$ represent $-1+2=+1$ and for sign combination (2) these signals represent $+1-2=-1$.

In terms of actual computation the summation of input signals and the production of output signals may appear as illustrated in the Examples 1 and 2 below.

*Example 1*

Sign Combination (2)

Total output $R+C=+1-2=-1$ $j=7$

| 5 | 6 | 7 | | $gOs$ |
|---|---|---|---|---|
| | | 1 | A | − |
| | | 0 | R+ | Input |
| | | 0 | C− | |
| | 1 | | R+ | Output |
| 1 | | | C− | |

*Example 2*

Sign Combination (4)

Total Output $R+C=+0-2=-2$ $j=3$

| 1 | 2 | 3 | | $gOs$ |
|---|---|---|---|---|
| | | 1 | A | − |
| | | 1 | R− | Input |
| | | 0 | C+ | |
| | 0 | | R+ | Output |
| 1 | | | C− | |

In Example 1, sign combination (2) is present where signals $gOs$, R, and C have the signs −+ and −, respectively. In this case a positive input signal A is to be subtracted, or a negative input signal A is to be added, to previous result digits R and C which are illustrated to be zero in this case. Since, according to the invention, the new carry must bear the sign of the operation signal $gOs$, it is negative. Furthermore the invention specifies that the new result signal must bear a sign opposite to that of the carry and therefore it is positive. Thus the total output result of −1 is accomplished, according to the invention, by generating a relative weight of +1 for signal R and a relative weight of −2 for signal C, the total sum of which is −1. It may be observed, at this point, that the terms partial result and carry signals as employed herein pertain to the binary digits in various places which must be combined to generate a total value. Thus $R=1$ in binary place 6 is a partial result digit and $C=-1$ in binary place 7 is a partial carry digit. The total result in the 6th place is then $+1-2=-1$.

In the Example 1 signal R is shifted one digital place to the left; that is, from position $j=7$ to position $j-1=6$. This shift will be discussed more fully below but briefly it is part of the division operation whereby the digits of each successive remainder will be combined with respective lower place digits of number A, which constitutes the divisor. The word combined, it may be noted, is intended to cover either addition or subtraction. In a similar manner each carry signal C is shifted to the left two positions so that, in the above examples, the partial carry input digit of 0 is in position 7 and the partial carry output digit of 1 is in position 5.

It will be understood that the digit values which are mentioned herein are relative with respect to the particular binary place referred to. Thus the values of +1 and −2, for the output signals R and C are referenced to binary digital position 6, in Example 1. The carry bears the relative weight of two since it is shifted to the next higher digital position, whereas the result bears the weight of 1 since it is in the sixth place. Another way of looking at the operation is that the combined weight of all input digits in digital position 7 of Example 1 is equal to the combined values of the binary digits in positions 5 and 6 as reference to position 6.

Another example as to how binary digits are combined according to the basic concept of the invention is shown in Example 2 above. In this case, sign combination (4) is illustrated where $gOs$, R, and C have signs − − and +, respectively. The carry output signal then bears the sign of $gOs$ which is minus and the result signal is opposite thereto and is therefore plus. Reference again to Table I, in the lower section where $K=0$, indicates that the combination 1 1 0 of the input signals A, R, and C has a total value of −2. This is developed in the output signals through signal $R=0$ and signal $C=-2$, referenced to binary digital place 2 in Example 2.

In the examples which are given below, following the derivation of the basic units of the invention, reference will be made again to Table I to show how certain output signals are generated. This can be done quite easily, however, without the use of Table I by giving the new carry the sign of signal $gOs$ and the new result an opposite sign and then determining the value which the output must assume in order to accomplish the proper total value. Thus if the total input value is −1 and the new carry is to be negative with a new result digit positive, both the new carry and the new result digits must be binary 1 to accomplish the total value. In a similar manner if the total value is +1, and the new carry is to be positive both result and carry digits must again be binary 1.

It will be observed in Table I that the output signal $Rj-1$ has the same value for either condition of the control signal K, and consequently a single logical definition may be expressed as follows:

$$Rj-1=Rj.Cj'.Aj'+Rj'.Cj.Aj'+Rj'.Cj'.Aj+Rj.Cj.Aj$$

where the dot (.) represents the logical "and" and the plus (+) represents the logical inclusive "or."

This expression defines an output signal which has a value of binary 1 whenever exactly one of the input signals $Aj$, $Cj$, and $Rj$ has a value of 1, or whenever all three of the input signals $Aj$, $Cj$, and $Rj$ have a value of binary 1.

It will be observed, however, that the carry output signal $Cj-2$ has different values depending upon the status of control signal K, or indirectly as a function of the sign comparison between the sign of the previous carry signal $Cj$ and $gOs$ and $Os$. In the case where control signal $K=1$, and the previous carry and input signals have the same sign, the carry output signal $Cj-2$ is noted to be a binary 1 whenever the previous result signal $Rj$ is 0 and either the previous carry $Cj$ is a binary 1 or the input digit $Aj$ is a binary 1; or signal $Cj-2$ is a binary 1 when the previous carry $Cj$ and input signal $Aj$ are both binary 1. This may be expressed logically as follows:

$$Cj-2=Rj'.(Cj+Aj)+Cj.Aj$$

It may be desirable in some cases to expand the logical expression for the carry signal to a two-level logical form as follows:

$$Cj-2=Rj'.Cj+Rj'.Aj+Cj.Aj$$

The logical definition of the carry output signal for the case where control signal $K=0$, and the previous carry and input signals have opposite signs, may be derived by observing that the carry is binary 1 whenever the previous result signal $Rj$ is a binary 1, and either the previous carry is a 0 or the previous input signal is a 1; and signal $Cj-2$ is also 1 if the previous carry $Cj$ is a 0 and the input signal $Aj$ is a binary 1. This may be expressed as follows:

$$Cj-2=Rj.(Cj'+Aj)+Cj'.Aj$$

or in two-level logic as follows:

$$Cj-2=Rj.Cj'+Rj.Aj+Cj'.Aj$$

A complete carry signal covering all possible input sign combinations may now be expressed as the logical combination of the two carry signals derived above, separated by the control signals K and K', where the signal K is assumed to be "on" for the condition $K=1$, and signal K′ is assumed to be "on" for the condition $K=0$. This may be written as follows:

$$Cj-2=K.(Rj'.Cj+Rj'.Aj+Cj.Aj)+K'.(Rj.Cj'+Rj.Aj+Cj'.Aj)$$

Table I may be used to derive a different set of logic for the signal $Cj-2$. Specifically, it is to be noted that when $Aj$ is 1 and $Rj$ and $Cj$ are alike, i.e., both are 0 or both are 1, $Cj-2$ is 1. This takes care of $Cj-1$ for either condition $K=1$ or $K=0$ in the second and last rows of digits shown in Table I for both conditions of K. For $K=1$, the Arabic 1's for $Cj-2$ in the third and fourth rows correspond to the conditions for $Rj=0$ and $Cj=1$. Similarly, for the 1's in the $Cj-2$ column for the condition $K=0$ in the fifth and sixth rows, the conditions for $Rj=1$ and $Cj=0$ are true. Thus, $Cj-2$ may alternatively be represented in a different set of logic as follows:

$$Cj-2=Aj.(Rj'.Cj'+Rj.Cj)+K'.(Rj.Cj'+K.Rj'.Cj)$$

It is obvious that this logic is simpler than the original set developed. Only twelve inputs are, in fact, required as distinguished from a prior 18. Further, the use of two logical "and" gates is obviated. For these reasons, the latter logic is preferred.

At this point note must be taken of the fact that the algebraic expressions above do not necessarily constitute particular circuit mechanization definitions since the various cases where the basic unit of the invention may be employed must each be considered separately. The reason for this will become apparent as various different utilizations of the arithmetic unit are introduced below. Accordingly, it will be understood that the logical algebra introduced above is in no way intended to constitute a particular definition of the invention, but rather to define a generic class of logical structure. Thus, the expressions for the result and carry are intended to be generic to a multitude of other forms which may be derived therefrom by well known algebraic techniques.

Since the sign of the carry input signal was determined by the previous operation sign $Os$, it may be stated that the control signal K assumes a binary 1, or "on" state whenever the previous and present operation sign signals $Os$ and $gOs$ are the same. In a similar manner, it may be stated that the control signal K becomes binary 0 or "off" whenever the previous and present operation signals are different. It will be understood, however, that the definition of control signal K in terms of the previous carry and present operation sign is equally applicable.

The signal K may be given a general definition in terms of the present operation sign signals $+gOs$ and $-gOs$ in view of the above observation that it assumes a value of binary 1 whenever the present and previous signs have the same value. This may be expressed as follows:

$$K=(+gOs).(+Os)+(-gOs).(-Os)$$

The general form of a network suitable for the arithmetic unit employed in the division system is shown in FIG. 3. It will be noted in FIG. 3 that in addition to the networks for producing the result and carry signals, as defined above, provision is also made for either shifting the result and carry signals ahead as formed under the control of signal N′ (indicating that $N=0$) or by effectively by-passing the unit by shifting the previous result and carry digits to the next higher places. The details of an appropriate circuit for generating signal N′ are introduced in the discussion which follows. Thus the new result signal $Rj-1$ is shifted ahead into the next register stage when signal $N'=1$ and signal $Rj$ is shifted ahead to the next stage, without modification, when signal N is equal to 1. This control may be expressed as follows:

$$\text{to } Rj-1=N'.gRj-1+N.Rj$$

where $gRj-1$ represents a signal produced as a function of input signals $Aj$, $Rj$, and $Cj$ according to the rules defined above. $Rj$, according to the above logic, is thus effecively shifted from flip-flop $Rj$ to flip-flop $Rj-1$. Thus the expression "to" combined with a signal such as $Rj-1$ to form a signal to $Rj-1$, is intended to indicate a transition from one position to another. The letter "$g$" will be employed throughout to represent the development of a logical gate signal in order to distinguish this signal from a flip-flop signal. Thus $gRj-1$ is a signal produced by a logical gate which is to be entered into flip-flop $Rj-1$. The specific means by which such a signal may be entered into a flip-flop in synchronism with a computer digit time interval are not shown in the present application since these are now well known in the art. All that need be known for the purpose of the present application is that the entire system logic is operative during each digit time interval—corresponding to a row group in the examples which follow—to perform the function designated by the particular logic. In other words, flip-flop $Rj-1$ receives a signal at the end of each digit time interval which is equal to $gRj-1$ developed by a gating circuit whenever the signal $N'=1$; and signal $Rj$ of flip-flop $Rj$ is entered into flip-flop $Rj-1$ whenever signal $N=1$; at the end of any digit time interval.

In a similar manner a carry storage device $Cj$ is shown which receives input signals in accordance with the following logic:

$$\text{to } gCj=N'.Cj+N.Cj+1$$

where signal N′ controls the entry of a new carry signal $gCj$ formed by an arithmetic unit in position $j+2$, and signal N controls the shifting of the carry signal $Cj+1$ of the next lower place to the storage device.

The manner in which the various units are interconnected in a typical system employing the invention is indicated in FIG. 4. In this figure the various units of FIG. 3 are referred to as full adder-subtracters FAS with designation numbers corresponding to the input digits thereto. Thus full adder-subtracter $FASn$ receives input signals $An$ and $Rn$ and produces output signals to $Rn-1$ and to $Cn-2$. It will be observed from FIG. 4 that a predetermined set of the most significant digits in the remainder register, starting from a place referred as $x$, are applied to a logical network and storage device $R_x$ for the most signifiant digits. Device $R_x$ produces a group of output signals, certain ones of which are applied to control devices $gOs$, K, and N producing operation sign signals $+gOs$ and $-gOs$; control signals K and K′; and control signals N and N′, respectively. The sign signals of device $gOs$ are entered into a storage device $Os$, the output signals $+Os$ and $-Os$ of which are also applied to control device K.

Output digits formed during the operation of the embodiment of FIG. 4 are generated through a network $gQ$ which receives the signals produced by device $Os$ and device N. Network $gQ$ produces plus and minus input digits for a quotient or root register which also receives a shift control signal $Q_x$.

The general scheme of FIG. 4 illustrates the generic form of several embodiments of the invention. In developing the basic principles involved, however, it is necessary to assume a particular example. Accordingly, the next discussion will relate to a specific division system and its particular logic. The general schematic form of this system is showns in FIGS. 5*a* and 5*b*. It will be noted that the digit position referred to above as constituting the point above which a set of the result and carry signals are analyzed in order to generate the various control signals, corresponds to the point $j=1$ in FIG. 5*b*. It will also be noted that additional stages $Ro$ and $Roo$ are included in the result register and additional stages $Co$ and $Coo$ are utilized.

The additional stages and associated gating circuits shown in FIG. 5*b* form the Logical Network and Storage for Most Significant Digits shown in FIG. 4. The particular connections for these additional stages will not be considered at this point since it is first necessary to develop the basic division logic of the invention. A further modification contemplated in the embodiment of FIG. 5 is that carry stage C*oo* does not store a carry, but rather the sign of the complete result digit which is entered into storage device R*oo*. It will be shown, in the logical development which follows, that this permits a considerable simplification in the logic which is required to detect the condition of the remainder during division.

amples then may be identified by a column and a row number. For example, digit A1—1 is a binary digit having a value of 1 in row A—1 and in column 1. In a similar manner digit R10—1 is a binary 1 appearing in row R—1 and column 10. With this convention, the first number in each digit representation corresponds to a flip-flop which stores the particular digit at a digit time which corresponds to the row number. Thus *R*10—1=1, indicates that a binary 1 is stored in flip-flop R10 during the first digit time interval or row group.

*Example 3*

2821/91=31

| K | N | gOs | | 00 | 0 | 1 | 2 | 3 | 4 | 5 | 6 | 7 | 8 | 9 | 10 | 11 | 12 | +Q | −Q |
|---|---|---|---|---|---|---|---|---|---|---|---|---|---|---|---|---|---|---|---|
| | | — | A-1 | | | 1 | 0 | 1 | 1 | 0 | 1 | 1 | 0 | 0 | 0 | 0 | 0 | | |
| 1 | 0 | | +R-1 | 0 | 0 | 1 | 0 | 1 | 1 | 0 | 0 | 0 | 0 | 0 | 1 | 0 | 1 | 1 | 0 |
| | | | −C-1 | | 0 | 0 | 0 | 0 | 0 | 0 | 0 | 0 | 0 | 0 | 0 | | | | |
| | 1 | | +R-2 | 0 | 0 | 0 | 0 | 0 | 0 | 1 | 1 | 0 | 0 | 1 | 0 | 1 | 0 | 0 | 0 |
| | | | −C-2 | | 0 | 0 | 0 | 0 | 1 | 1 | 0 | 0 | 0 | 0 | 0 | | | | |
| | 1 | | +R-3 | 0 | 0 | 0 | 0 | 0 | 1 | 1 | 0 | 0 | 1 | 0 | 1 | 0 | 0 | 0 | 0 |
| | | | −C-3 | | 0 | 0 | 0 | 1 | 1 | 0 | 0 | 0 | 0 | 0 | 0 | | | | |
| | 1 | | +R-4 | 0 | 0 | 0 | 0 | 1 | 1 | 0 | 0 | 1 | 0 | 1 | 0 | 0 | 0 | 0 | 0 |
| | | | −C-4 | | 0 | 0 | 1 | 1 | 0 | 0 | 0 | 0 | 0 | 0 | 0 | | | | |
| | | + | A-5 | | | 1 | 0 | 1 | 1 | 0 | 1 | 1 | 0 | 0 | 0 | 0 | 0 | | |
| 0 | 0 | | +R-5 | 0 | 0 | 0 | 1 | 1 | 0 | 0 | 1 | 0 | 1 | 0 | 0 | 0 | 0 | 0 | 1 |
| | | | −C-5 | | 0 | 1 | 1 | 0 | 0 | 0 | 0 | 0 | 0 | 0 | 0 | | | | |
| | | — | A-6 | | | 1 | 0 | 1 | 1 | 0 | 1 | 1 | 0 | 0 | 0 | 0 | 0 | | |
| 0 | 0 | | −R-6 | 0 | 0 | 0 | 0 | 1 | 0 | 0 | 1 | 1 | 0 | 0 | 0 | 0 | 0 | 0 | 0 |
| | | | +C-6 | | 0 | 1 | 1 | 0 | 1 | 1 | 1 | 0 | 0 | 0 | 0 | 0 | 0 | | |
| | 1 | | +R-7 | 0 | 0 | 1 | 0 | 0 | 1 | 1 | 0 | 0 | 0 | 0 | 0 | 0 | 0 | 0 | 0 |
| | | | −C-7 | | 0 | 1 | 0 | 0 | 1 | 1 | 0 | 0 | 0 | 0 | 0 | 0 | 0 | | |

*Example 4*

105/5=21

| K | N | gOs | | 00 | 0 | 1 | 2 | 3 | 4 | 5 | 6 | 7 | Q |
|---|---|---|---|---|---|---|---|---|---|---|---|---|---|
| | | — | A-1 | | | 1 | 0 | 1 | 0 | 0 | 0 | 0 | |
| 1 | 0 | | +R-1 | 0 | 0 | 1 | 1 | 0 | 1 | 0 | 0 | 1 | +1 |
| | | | −C-1 | | 0 | 0 | 0 | 0 | 0 | 0 | 0 | 0 | |
| | | — | A-2 | | | 1 | 0 | 1 | 0 | 0 | 0 | 0 | |
| 1 | 0 | | +R-2 | 0 | 0 | 1 | 1 | 1 | 0 | 0 | 1 | 0 | +1 |
| | | | −C-2 | | 0 | 1 | 0 | 0 | 0 | 0 | | | |
| | | + | A-3 | | | 1 | 0 | 1 | 0 | 0 | 0 | 0 | |
| 0 | 0 | | +R-3 | 1 | 1 | 1 | 0 | 0 | 0 | 1 | 0 | 0 | −1 |
| | | | −C-3 | | 0 | 0 | 0 | 0 | 0 | 0 | | | |
| | | — | A-4 | | | 1 | 0 | 1 | 0 | 0 | 0 | 0 | |
| 0 | 0 | | −R-4 | 0 | 0 | 0 | 1 | 0 | 1 | 0 | 0 | 0 | +1 |
| | | | +C-4 | | 0 | 1 | 0 | 1 | 0 | 0 | | | |
| | | + | A-5 | | | 1 | 0 | 1 | 0 | 0 | 0 | 0 | |
| 0 | 0 | | +R-5 | 0 | 0 | 1 | 0 | 1 | 0 | 0 | 0 | 0 | −1 |
| | | | −C-5 | | 1 | 0 | 1 | 0 | 0 | 0 | | | |
| | 1 | | −R-6 | 0 | 0 | 1 | 0 | 0 | 0 | 0 | 0 | 0 | 0 |
| | | | +C-6 | | 0 | 1 | 0 | 0 | 0 | 0 | | | |

In Example 3 the binary number 1011011, corresponding to the decimal number 91, constitutes the divisor which is entered as the number A—1. The dividend is shown as number R—1 which is the binary number 101100000101, corresponding to the decimal number 2821 and is initially entered into the partial remainder register appearing in storage devices R1 through R12, respectively.

Each column in Examples 3 and 4 has a binary digital place number corresponding to the notation employed in FIG. 5. Thus place 00 corresponds to the most significant digit position and is in the group of three digits which are sensed to determine the condition of the remainder, as is more fully discussed below. Each digit in the examples then may be identified by a column and a row number.

During each digit time interval each group of input digits in a particular place are sensed and translated into the output signals which appear in the proper place during the next digit time interval. Thus signals A10—1, R10—1, and C10—1 are combined to generate output signals R9—2 and C8—2. The proper values may be determined by referring to Table I above noting that *K*=1 and that the signs of *g*O*s*, R, and C are — + — and there are of type (2). As indicated in Table I the total value for the situation where the input digits are 010 is +1. The output digits R*j*—1 and C*j*—2 are then noted to be 1 and 0 in Table I corresponding to the value shown in Example 3 for digits R9—2 and C8—2.

The development of the various binary digits in Examples 3 and 4 may be determined more rapidly by simply applying the appropriate signs to the digits in a particular column to determine the total value and by then giving the new carry the sign of the previous signal *gOs* and the new result signal the opposite sign with appropriate values being selected to represent the total value. In Example 3 digits A7—1, R7—1 and C7—1 have the values 100, respectively. Since A7—1 assumes the sign of signal *gOs* which is minus the total value for this group of input signals is −1. Output signals R6—2 and C5—2 are noted to be positive and negative since C5—2 assumes the sign of the previous signal *gOs* during digit time interval 1, and signal R6—2 is opposite in sign thereto. Thus the value of −1 in binary place 7 is represented by *C5—2*=−2 (relative to binary place 6) +*R6—2*=+1. The manner in which the other digits of Examples 3 and 4 are developed should be apparent from these examples.

It will be noted that the first operation sign *gOs* in row group −1 of Example 3 is assumed to be minus and that the first quotient digit entered is +*Q*=1. Thereafter, whenever N equals 0, indicating that either addition or subtraction is to be performed, a plus quotient digit +Q is entered into the quotient register when the operation sign is negative, and a minus quotient digit −Q is entered into the quotient register when the operation sign is positive.

As in the previous examples, each time the operation sign is negative, the new carry which is formed is negative and the result signals are positive. Thus, all of the digits in row R–2 of Example 3 are positive and those in C–2 are negative in view of the negative sign *gOs*.

In performing division according to the present invention a predetermined group of the most significant digits in the result and carry registers are sensed in order to determine the sign of the remainder or to detect a zero condition in this group. As an illustration it is assumed in Examples 3 and 4 that digit column 00, 0, and 1 contain the digits which are sensed in order to determine the condition of the remainder. Thus digits R*oo*—1, R*o*—1, and R1—1 are sensed along with digits C*o*—1 and C1—1 to note in Example 3 that the detected value of the remainder is +1. This is determined, as it is more fully explained below, by assuming the digit position 00, 0, and 1 to have the significance of 4, 2, and 1 with the sign being indicated to the left of the particular row.

Whenever the indicated or detected remainder digits are found to represent the positive remainder subtraction is performed as the next operation. Thus *gOs* is negative in the first row group. If the predetermined group of most significant digits is representative of a zero total value signal N becomes 1 in a manner more specifically described below indicating that a "do nothing" operation must be performed. In this case the digits in a particular row group are shifted left so they appear in the next group in respective shifted digital positions. Thus digits R5—2, R6—2, R7—2, through R11—2 representing the binary number 1100101 are shifted by entering the respective signals into respective flip-flops in the next higher digital position (according to the notation this causes a decrease in binary digit position number). The binary number 100101 then appears in signals R4—3, R5—3, through R10—3, respectively. In a similar manner carry digits 11 in signals C4—2 and C5—2 are entered into position C3—3 and C4—3. It will be noted that each time the "do nothing" operation is performed zeros are entered into the quotient digit positions for +Q and −Q. In Example 3 the detected total remainder in the predetermined positions is noted to be −1 in the row 5 group, that is only signal C1—5 equals one in this position. Thus operation sign signal *gOs* is plus and addition is performed at this time. It will be noted that signal A is not shown in those positions where a "do nothing" operation is performed since these signals are not combined according to the rows discussed above at this time.

It will be noted that signal *K*=1 whenever the sign of signal *gOs* and that of the carry are the same as occurs in row group 1 of Example 3 and in row groups 1 and 2 in Example 4. The value of signal K is not specified during those times when signal *N*=1, since it need not be known and is zero whenever the sign signal *gOs* and that of the carry are opposite. In actual operation, discussed more fully below, this is accomplished by storing sign *gOs* for a digit time interval so that during the next interval the previous signal *gOs is* the same as the carry signal and is then compared to the present signal *gOs* then being generated in order to generate signal K. Thus according to the invention it may be stated either that signal K is equal to one when signals *gOs* and C have the same sign or that signal K is equal to 1 when signal *gOs* and O*s* have the same sign, O*s* representing the previous signal *gOs*.

The complete answer is determined by combining the plus and minus quotient digits serially. Effectively, the answer is a plus binary number +100001 and a minus binary number −000010, or +33−2=31 corresponding to the binary number +11111.

It will be noted that the quotient is shown as a series of plus and minus signals in Example 4 to illustrate another manner of definition. The complete answer, then is +11010 −00101 or +10101, corresponding to the decimal number 21.

It will be assumed further for the purpose of the present illustration that the divisor always has a binary 1 in the most significant position A1. If the digital position of the most significant divisor digit is considered to be just to the left of the binary point, then the binary digits in this place and the next two more significant places may be considered to have weights 1, 2, and 4, respectively. For example, if the remainder register digits R*oo*, R*o*, and R1 represent the binary number 111, the total weight thereof may be +7.

The various weights for the predetermined set of remainder digits for the various combinations thereof and various previous operation signs represented by O*s* are shown in FIG. 6.

As an illustration of the manner in which the various values have been derived from FIG. 6 consider Example 5 below:

*Example 5*

| | R*o* | C*o* | R1 | C1 | +4<br>− O*s*<br>+ C*oo*<br>1 R*oo* | |
|---|---|---|---|---|---|---|
| (+3) | 1 | 0 | 1 | 0 | +7 | Total Value |

The total value of +7 in Example 5 is taken from the upper left hand corner of FIG. 6 at the intersection of the signals O*s*, C*oo*, and R*oo*=±1 and R*o* C*o* R11 C1=1010

The number (+3) to the left of the signals R*o*, C*o*, R1, C1 represents the summation of the R*o* digit with a weight of +2 and the R1 digit with a weight of +1. The sign of plus for this combination is determined by a sign of signal O*s* which is the previous operation sign. The result digits are always of opposite sign to the previous result sign. The value of +4 at the top of the column in Example 5 represents the weight of signal R*oo*, the sign being given by signal C*oo*. Thus +7 represents the total equivalent weight of the predetermined set of most significant digits which are examined in order to determine the state of the partial remainder during division.

Another example indicating the manner in which the total values of FIG. 6 are derived is illustrated in Example 6 as follows:

*Example 6*

| R*o* | C*o* | R1 | C1 | +4<br>+ O*s*<br>+ C*oo*<br>1 R*oo* | |
|---|---|---|---|---|---|
| 1 | 0 | 1 | 0 | +1 | (−3) |

In this case sign $Os$ is plus so that the total value of digits $Ro$ and $R1$ is equal to $-3$. The combination $Coo$ and $Roo$ again has a value of $+4$ so that the total value in these most significant places is indicated to be $+1$.

Each column in FIG. 6 then may be noted to consist of the summation of the number at the top of the column indicating the value of signal $Coo$ and $Roo$ and the value at the left for negative $Os$ or the value at the right for positive $Os$. Thus $+4$ is combined with $+3$, $+2$, $+1$, etc. to provide the numbers $+7$, $+6$, $+6$, and $+5$, respectively in the first total value column and $-4$ is combined with the negative row values $-3$, $-2$, $-2$, and $-1$ to provide the total values of $-7$, $-6$, $-6$, and $-5$ in the extreme right hand column of values.

Eight zeros will be noted in FIG. 6 corresponding to situations where signal $Roo$ is zero and the total value of signals $Roo$, $Co$, $R1$ and $C1$ is equal to zero. It will be noted that this latter condition may occur even though binary 1's may appear in certain signals. The zero row condition is characterized, however, by a cancellation of the digits $Ro$ and $Co$ or $R1$ and $C1$ which have opposite signs according to the basic technique of the invention.

The value chart in FIG. 6 may now be employed to derive the basic logic for signals N, $-gOs$ and $+gOs$ as indicated in FIGS. 7 and 8. In FIG. 7 it will be noted that signal N appears at the position wheer all zeros occur in the chart of FIG. 6. It will be noted that heavy lines are employed to surround the position around letter N where the binary signals of the various variables have the proper state for a "do nothing" operation. In other words the chart of FIG. 7 illustrates the situation mentioned above with respect to Examples 3 and 4 where it is not possible to detect the magnitude or sign of the remainder in the predetermined set of most significant digits and therefore is necessary to shift the remainder until such digits appear as will indicate whether addition or subtraction should be performed.

In FIG. 8 various areas are designated where addition must be performed to generate the next partial remainder—being indicated by the presence of signal $+gOs$, and other areas are indicated to indicate where subtraction must be performed—being indicated by areas where signal $-gOs$ is present. It will be noted that these areas correspond to the situations where plus or minus 1's appear in FIG. 6. If a $+1$ appears FIG. 8 then shows signal $-gOs$ whereas if a $-1$ appears FIG. 8 shows signal $+gOs$.

It is not necessary to generate signals $gOs$ of either sign in areas which are not enclosed with solid lines since the divisor may be positioned so that its most significant digit is in the binary 1 value position to assure that each time a $+1$ occurs it is reduced to 0 or $-1$. This means, then, that the higher value shown in FIG. 6 can be prevented by the operation of the division system and therefore need not be considered in the logic which is derived below. Signal N may then be derived in terms of logical algebra based on FIG. 7 as follows:

$$N=(Ro.Co+Ro'.Co').(R1.C1+R1'.C1')Roo'$$

This indicates, as mentioned above, that a zero value occurs and a do nothing operation is specified whenever digits $Ro$ and $Co$ have the same value and, at the same time, digits $R1$ and $C1$ have the same value and $Roo$ is equal to zero.

In deriving the logic for signals $+gOs$ and $-gOs$ it should be noted that each signal may cover all combinations except those included by the other signal. That is, it is permissive for the logic to cover those areas in FIG. 8 which include more than the enclosed solid line areas marked $-gOs$ provided that such an inclusion does not overlap an area marked $+gOs$ enclosed by solid line.

Thus the entire column designated by $+Coo$ and $Roo=1$ may be considered appropriate for generating signal $-gOs$. Reference to FIG. 6 shows that only the lower left hand corner has the value of $+1$ which is possible in the proper operation of division whereas the other numbers in the column are not possible. In a similar manner signal $+gOs$ may include the logic $-Coo$ and $Roo=1$.

The other area divisions of FIG. 8 may be accomplished more conveniently by defining functions $Fa$ and $Fb$ shown in binary form in FIG. 7 which provides an approximate half way division of the table by separating the upper half from the lower half. Signal $Fa$ is definable as the function:

$$Fa=Ro.Co'+Ro.C1'+Co'.C1'$$

This function means that $Fa=1$ whenever $Ro$ and $Co'$ are equal to 1 or $Ro$ and $C1'$ are equal to 1 or $Co'$ and $C1'$ are equal to 1. Thus the (.) represents the logical "and" and the plus represents the logical inclusive "or."

A similar function may be generated to cover the area in the columns of $+Os$ and $Roo=0$, this function being represented as $Fb$ in FIG. 8 defined as follows:

$$Fb=Ro'.Co+Ro'.C1+Co.C1$$

A complete designation for signal $-gOs$ may thus be expressed as follows:

$$\begin{aligned}-gOs&=(+Coo).Roo+Roo'.[(-Os).Fa+(+Os).Fb]\\&=(+Coo).Roo+Roo'.[(-Os).(Ro.Co'+Ro.C1'+Co'.C1')+(+Os).(Ro'.Co+Ro'.C1+Co.C1)]\end{aligned}$$

If it is noted that the function $Fa$ is complementary to the function $Fb$ in view of the fact that the sum of these functions cover all possibilities for the signals $Ro$, $Co$, $R1$, and $C1$, the function for $+gOs$ may be generated as the complement of $-gOs$ by inspection as follows:

$$\begin{aligned}+gOs&=(-Coo).Roo+Roo'.[(-Os).Fb+(+Os).Fa]\\&=(-Coo).Roo+Roo'.[(-Os).(Ro'.Co+Ro'.C1+Co.C1)+(+Os).(Ro.Co'+Ro.C1'+Co'.C1')]\end{aligned}$$

Both the equations for to $(-Os)$ and to $(+Os)$ thus may reduce to the following in terms of 1 and 0 settings $1Os$ and $0Os$ as follows:

$$1(-Os)=(+Coo).Roo+Roo'.(+Os).(Ro'.Co+Ro'.C1+Co.Ci)$$

$$o(-Os)=(-Coo).Roo+Roo'.(-Os).(Ro'.Co+Ro'.C1+Co.Ci)$$

Where $(-Os)$ is redundant in the expression for $1(-Os)$ and similarly $(+Os)$ is redundant in the expression for $o(-Os)$.

The validity of this expression may be observed by referring again to FIG. 8 and noting the respective areas which are covered.

From the consideration above, we have the general expression for control signal K as follows:

$$K=(-gOs).(-Os)+(+gOs).(+Os)$$

from which we may derive an expression directly in terms of the remainder digits as follows:

$$\begin{aligned}K&=(-Os).[(+Coo).Roo+Roo'.Fa]+(+Os).[(-Coo).Roo+Roo'.Fa]\\&=Roo.[(-Os).(+Coo)+(+Os).(-Coo)]+Roo'.Fa\\&=Roo.[(-Os).(+Coo)+(+Os).(-Coo)]+Roo'.(Ro.Co'+Ro.C1'+Co'.C1')\end{aligned}$$

In reconsidering the chart of FIG. 8, it will be noted that other variations are possible in defining signals $-gOs$ and $+gOs$ and, consequently, also in defining signal K. For example, it will be noted that the expression of the function $Fa$ may be modified by replacing signal $C1'$ therein with signal $R1$. In a similar manner, function $Fb$ may be modified by replacing signal $C1$ therein with signal $R1'$. This means that either of functions $Fa$ or $Fb$ may assume any one of four variations depending upon the particular usage of the substitutions, for example:

$$\begin{aligned}Fa&=Ro.Co'+R1(Ro+Co')\\&=Ro.Co'+Ro.R1+Co'.C1'\end{aligned}$$

Since the signals generated by network gOs during the time that signal $N=1$ may not represent any significant operation sign, device Os only receives useful information at such time as control $N'=1$, wherein N' is the complement of N. Thus the storage input circuit for device Os may be defined as follows:

$$-Os=(-gOs).N'$$
$$+Os=(+gOs).N'$$

In terms of a flip-flop, the signal −Os may be entered into a 1-setting input circuit and the signal +Os into a 0-setting input circuit so that output signals Os and Os' may be defined representing negative and positive previous operation signs, respectively. It may be noted that this notation is employed in the above-mentioned copending application, the input notation being expressed as follows:

$$1Os=(-gOs).N'$$
$$oOs=(+gOs).N'$$

The logical network definitions which have just been developed may be utilized in several different manners. It will be shown below that it is possible to avoid the use of network gOs other than to provide a signal which is shifted into storage device Os. In this employment of the above logic, both signals −gOs and +gOs may be generated and shifted into storage device Os. However, a somewhat simpler logical approach is to generate signal −gOs and to apply this signal to a complementing amplifier providing both the necessary power for further utilization and the required signal +gOs. In this situation, the amplifier signals may be shifted into storage device Os and also be employed, as will be shown below, in certain other logical functions.

It will also be observed from the above discussion that signal K may have two different types of definition. In the first place, it may be defined as a function of the present and previous operation signs. This may be accomplished, for example, by utilizing the amplifier signals −gOs and +gOs in a second network. However, note must be taken of the fact that signal K must be produced without delay and, consequently, implies a second amplifier. This may mean, in some cases, that a circuit delay would result due to the presence of a first amplifier driving a second amplifier or that a circuit instability may occur. In this latter case, it would then be preferable to utilize the second definition of signal K generated in terms of the stored remainder signals and operation sign signals −Os and +Os.

The general schematic form which the networks for generating signals N, N'; −gOs, +gOs; and K, K'; are shown in FIGS. 9, 10, and 11, respectively. These networks illustrate situations where amplifiers are employed to complement and increase the power of the logical signals produced by the respective networks. It will be understood, of course, that the drawings are only intended to indicate the general logical arrangement of the network and not intended to indicate a preference for the utilization of the amplifier.

In the above discussion, it has been assumed that signal Roo represents a complete result digit in the most significant remainder place and that Coo represents the sign thereof. The manner in which logical networks may be developed for producing such signals will now be considered, reference being made to FIG. 12 showing a chart of the various binary weights which may appear for the different combinations of signals Ro, Co, R1, and C1 for row values, and signals N, gOs, Os, K, Coo, and Roo designating respective columns.

The manner in which the chart of FIG. 12 has been derived may best be illustrated by considering those columns where $Roo=0$. As a starting point, the columns which are further designated by $K=0$, or the situation where signals Os and gOs represent opposite signs, will be considered.

The following examples illustrate the binary configuration which appears in the most significant remainder place and one higher place. It will be understood, of course, that actually a total result greater than binary 1 cannot be allowed in digit Roo. However, as above, it is useful to develop all of the logical combinations and to designate required and optional areas.

∓Os and ±gOs, K=0, N=0

±2

| | | 00 | o | 1 |
|---|---|---|---|---|
| ±R | | | 1 | 1 |
| ∓C | | | 0 | 0 |
| ±A | | | | 1 |
| ∓R | | 1 | 0 | |
| ±C | 1 | 1 | | |

| | | 00 | o | 1 |
|---|---|---|---|---|
| ±R | | | 1 | 0 |
| ∓C | | | 0 | 0 |
| ±A | | | | 1 |
| ∓R | | 1 | 1 | |
| ±C | 1 | 1 | | |

| | | 00 | o | 1 |
|---|---|---|---|---|
| ±R | | | 1 | 1 |
| ∓C | | | 0 | 1 |
| ±A | | | | 1 |
| ∓R | | 1 | 1 | |
| ±C | 1 | 1 | | |

±1

| | | 00 | o | 1 |
|---|---|---|---|---|
| ±R | | | 0 | 1 |
| ∓C | | | 0 | 0 |
| ±A | | | | 1 |
| ∓R | | 0 | 0 | |
| ±C | 0 | 1 | | |

| | | 00 | o | 1 |
|---|---|---|---|---|
| | | | 1 | 0 |
| | | | 0 | 1 |
| | | | | 1 |
| | | 1 | 0 | |
| | 1 | 0 | | |

| | | 00 | o | 1 |
|---|---|---|---|---|
| | | | 1 | 1 |
| | | | 1 | 0 |
| | | | | 1 |
| | | 0 | 0 | |
| | 0 | 1 | | |

| | | 00 | o | 1 |
|---|---|---|---|---|
| | | | 0 | 0 |
| | | | 0 | 0 |
| | | | | 1 |
| | | 0 | 1 | |
| | 0 | 1 | | |

| | | 00 | o | 1 |
|---|---|---|---|---|
| | | | 0 | 1 |
| | | | 0 | 1 |
| | | | | 1 |
| | | 0 | 1 | |
| | 0 | 1 | | |

| | | 00 | o | 1 |
|---|---|---|---|---|
| | | | 1 | 0 |
| | | | 1 | 0 |
| | | | | 1 |
| | | 0 | 1 | |
| | 0 | 1 | | |

| | | 00 | o | 1 |
|---|---|---|---|---|
| | | | 1 | 1 |
| | | | 1 | 1 |
| | | | | 1 |
| | | 0 | 1 | |
| | 0 | 1 | | |

0

| | | oo | o | 1 |
|---|---|---|---|---|
| ±R | | | 0 | 0 |
| ∓C | | | 0 | 1 |
| ±A | | | | 1 |
| ∓R | | 0 | 0 | |
| ±C | 0 | 0 | | |

| | | oo | o | 1 |
|---|---|---|---|---|
| ±R | | | 0 | 1 |
| ∓C | | | 1 | 0 |
| ±A | | | | 1 |
| ∓R | | 1 | 0 | |
| ±C | 0 | 1 | | |

| | | oo | o | 1 |
|---|---|---|---|---|
| ±R | | | 1 | 0 |
| ∓C | | | 1 | 1 |
| ±A | | | | 1 |
| ∓R | | 0 | 0 | |
| ±C | 0 | 0 | | |

| | | oo | o | 1 |
|---|---|---|---|---|
| ±R | | | 0 | 0 |
| ∓C | | | 1 | 0 |
| ±A | | | | 1 |
| ∓R | | 1 | 1 | |
| ±C | 0 | 1 | | |

| | | oo | o | 1 |
|---|---|---|---|---|
| ±R | | | 0 | 1 |
| ∓C | | | 1 | 1 |
| ±A | | | | 1 |
| ∓R | | 1 | 1 | |
| ±C | 0 | 1 | | |

∓1

| | | oo | o | 1 |
|---|---|---|---|---|
| ±R | | | 0 | 0 |
| ∓C | | | 1 | 1 |
| ±A | | | | 1 |
| ∓R | | 1 | 0 | |
| ±C | 0 | 0 | | |

Considering first the example where the weight in, or to the left of, the most significant remainder place is ±2, it will be noted that where we have —O*s* and +*g*O*s*, a +1 divisor digit appears in position A (due to our assumption that the divisor must have a 1 in this position) and is added to a plus remainder digit +R resulting in the new digit *Ro*=0 and carry of 1. The combination of a previous plus result digit *Ro*=1 and a previous carry digit *Co*=0 is shown as producing a new minus result digit *Roo*=1 and a plus carry digit of 1 according to the usual method of the invention where the result and carry signals are given opposite signs, the carries assuming the sign of the present operation as indicated by *g*O*s*.

Thus we have, in this particular situation, a total weight of —1 for the result digit and +3 for the carry digits, constituting a total weight in the most significant place of +2 or if we had originally assumed +O*s* and —*g*O*s*, we would have a result digit of +1 and carry digits having a value of —3, the total weight being —2.

Referring again to FIG. 12, it will be noted that a +2 appears in the row designated by the combination 1010 for signals R*o*, C*o*, R1, and C1 and the columns designated by *K*=0 and *Roo*=0, where signal O*s* is minus, and that a —2 appears under the same conditions where signal O*s* is plus. In a similar manner the code combinations 1000 and 1011 for signals R*o*, C*o*, R1, and C1 also result in total values of +2 and —2 for the above conditions; namely: ∓O*s*, *K*=0, and *N*=0.

It will next be noted that a value of +1 is specified for the following code combinations of R*o*, C*o*, R1, and C1: 0010; 1001; 1110; 0000; 0011; 1100; and 1111. In these there is a carryover to the most significant place of +1 or there appears both a carry digit of relative weight ±2 and a result digit of weight ∓1. These situations must be accounted in defining signals —*g*O*s* and +*g*O*s* since they represent actual possibilities in terms of the remainder. In a similar manner the value of O appearing in the most significant places must also be accounted for and will be noted to occur for five possibilities: 0001; 0110; 1101; 0100; and 0111. Finally, it will be noted that the combination 0101 of signals R*o*, C*o*, R1, and C1 results in a ∓1 value.

The other values in the chart of FIG. 12 may readily be determined from the basic set which has just been considered by making several observations. First, it should be noted that the value in a column where R*oo* is 0 is increased or decreased by 2 when the only change made in going to the next column is to increase R*oo* to 1. For example, it will be noted that the values in the columns designated by the combination 0+—0+0 and 0+—0—0 for signals N, *g*O*s*, O*s*, K, C*oo*, and R*oo* are the same and are increased by 2 in going to the column designated by the code 0+—0+1 and decreased by 2 in going to the column designated by 0+—0—1.

In a similar manner the values in the columns designated by 0—+0+0 and 0—+0—0 are the same and are increased by 2 in column 0—+0+1 and decreased by 2 in column 0—+0—1.

A simple correlation is also apparent between those signals existing under columns where *K*=0 and those appearing where *K*=1. Since this change may be caused by a change of sign in either signal O*s* or *g*O*s*, the comparison may be made by considering columns where signals *g*O*s* have the same sign and signals O*s* have opposite signs or where signals *g*O*s* are opposite and O*s* are the same.

As an example, consider first the column designated by the code 0+—0—0 as compared to the column having the same values except for the change in signal O*s* from minus to plus and *K* from 0 to 1; namely, column 0++1—0. It will be noted that the numbers in the latter column are the same as those in the former if the rows are considered in inverse succession. That is, the first row position of one (+2) corresponds to the last row potion (+2) of the other. The reason for this is that the combination 1010 in the first row for signals R*o*, C*o*, R1, and C1 has the same value but an opposite sign to the combination 0101 appearing in the last row. Therefore, when the sign of signal O*s* changes from minus to plus and where the binary values of the result and carry signals are interchanged, we return to the same total value and sign for the row and column intersection.

Similar situations where the sign O*s* may be changed and the result and carry signals are interchanged whereby the total result in the place remains the same may be observed comparing rows: 1000 and 0100; 1011 and 0111; 0010 and 0001; 1001 and 0110; and 1110 and 1101, at respective column intersections.

In general the values in the chart of FIG. 12 for the do nothing operation where *N*=1 are obtained from those in corresponding columns in the section of the chart where *N*=0 by subtracting 1 from the value for those areas where *K*=0 and adding 1 to the value for those areas where *K*=1, with the following exceptions. Where *K*=0, the value is left unmodified whenever the signal *R*1=0 and signal *C*1=1 and where *K*=1, the value is left unchanged where signal *R*1=1 and signal *C*1=0.

The reason for the above situation is that when the do nothing operation is performed, the divisor digit is not combined with the previous remainder. Thus, corresponding columns in the chart in the section where $N=0$ and $N=1$ differ by the divisor digit given the sign of $gOs$. The exceptional cases occur where the divisor digit was previously canceled by the result or carry digit. When $K=0$ this occurs where $R1=0$ and $C1=1$ since where the divisor is $+1$ ($+gOs$) the carry is $-1$ ($-Os$) and where the divisor is $-1(-gOs)$ the carry is $+1$ ($+Os$). Therefore, the values for $N=0$ and $N=1$ remain unchanged. In a similar manner when $K=1$, the values for $N=0$ and $N=1$ are the same where $R1=1$ and $C1=0$ since a divisor digit of $+1$ ($+gOs$) means a result digit of $-1$ ($+Os$) and a divisor digit of $-1$ ($-gOs$) means a result digit of $+1$ ($-Os$).

From the table of FIG. 12 we may now derive the logical expressions for generating signals representing the total value in the most significant remainder digit position. These values will be referred to as $1Roo$ and $oRoo$ to represent total values of 1 and 0, respectively, in the corresponding place. Since we are not interested in the sign of the digit this time, we may develop a chart, such as is shown in FIG. 13, indicating the various absolute values of the digits shown in the chart of FIG. 12. In FIG. 13 the areas enclosed by solid lines wherein binary 1's appear are those where we must generate a signal $1Roo$ and the areas enclosed by solid lines where binary 0's appear are those where we must generate a signal $oRoo$. As before, areas enclosed by dotted lines represent optional cases. However, it must be noted that where the dotted lines enclose binary 1's the only option is to generate a signal $1Roo$ or not, but it is not permissible to generate a signal $oRoo$. In a similar manner where the dotted area enclosed a 0, it is permissible to generate signal $oRoo$ but not $1Roo$.

In developing the logic which follows, it is convenient to utilize certain functions of signals $Ro$, $Co$, $R1$, and $C1$ defined as follows:

$$Fc=Ro.Co'$$
$$Fd=R1.C1'$$
$$Fe=Ro'.Co$$
$$Ff=R1'.C1$$
$$Fg=(Fe+Ff)'=(Ro'.Co+R1'.C1)'=(Ro+Co').(R1+C1')$$
$$Fh=(Fc+Fd)'=(Ro.Co'+R1.C1')=(Ro'+Co).(R1'+C1)$$

The binary values for these functions are shown to the left of the chart in FIGURE 12.

Utilizing these functions we may now develop signals $1Roo$ and $oRoo$ as follows:

$$\begin{aligned}1Roo&=N'.Roo'.[K'.(Fc+Fg)+K.(Fe+Fh)+Fc.Fd+Fe.Ff]+N.(Fc+Fe)\\&=N'.Roo'.(K'.Fg+K.Fh)+Fc.(N+Roo'.Fd+Roo'.K)+Fe.(N+Roo'.Ff+Roo'.K)\\&=N'.Roo'.[K.(Ro'+Co).(R1'+C1)+K'.(Ro+Co').(R1+C1')]\\&\quad+Ro.Co'.(N+Roo'.R1.C1'+Roo'.K')+Ro'.Co.(N+Roo'.R1'.C1+Roo'.K)\\oRoo&=N'.[K'.Fc.Fg+K.Fc.Fh]\\&=N'.[K'.Ro.Co'.(R1+C1')+K.Ro'.Co.(R1'+C1)]\end{aligned}$$

It is assumed in the above logic that the signals $1Roo$ and $oRoo$ are entered into a storage device or flip-flop. This obviates the necessity of generating any signal corresponding to the present state of the flip-flop. Thus it will be noted that signal $oRoo$ need only cover those cases where $Roo$ is 1 and must bet set to 0; and signal $1Roo$ need only cover those cases where $Roo$ is 0 and must be set to 1.

While the flip-flop or other storage device need not be actuated when it is in the desired state, care must be taken in defining the networks to prevent the simultaneous application of signals to both input circuits unless the device is designed to respond properly. The above network definition, however, is suitable for most types of flip-flops in view of the fact that the simultaneous application of a signal to both input circuits is not possible.

It will be noted that it is never necessary to reset device $Roo$ to 0 during the do nothing operations. The reason for this becomes quite apparent when it is considered that a do nothing operation would not be performed if any significant digits appeared in the most significant portion of the remainder.

A similar procedure is followed in deriving the logic for the sign of signal $Coo$ stored in device $Coo$. Reference for this purpose is made to FIG.14 showing those areas where the plus and minus signs must occur, as surrounded by solid lines, or may occur where dotted lines are indicated. It will be noted in FIG. 14 that no signs are shown where the number 2 or the number 0 is indicated. The reason for this is that these cases permit either sign to be entered, the case where the value is 2 being impossible, and the case where an 0 exists in the digit $Roo$ making it unnecessary to know the sign thereof.

As before, it is convenient to utilize certain logical functions as follows:

$$Fc=Ro.Co'$$
$$Fe=Ro'.Co$$
$$Fi=(Ro.Co+Ro'.Co')$$

With these functions we may express the sign logic as follows:

$$\begin{aligned}-Coo&=Roo'.[(-Os).Fa+(+Os).Fc+(-gOs).Fi]\\&=Roo'.[(-Os).Ro'.Co+(+Os).Ro.Co'+(-gOs).(Ro.Co+Ro'.Co')]\\+Coo&=Roo'.[(-Os).Fc+(+Os).Fe+(+gOs).Fi]\\&=Roo'.[(-Os).Ro.Co'+(+Os).Ro'.Co+(+gOs).(Ro.Co+Ro'.Co')]\end{aligned}$$

As above, it will be understood that the logic assumes an entry into a storage device where it is unnecessary to cause a change if the device already registers the desired signal.

The network for device $Coo$ may be modified to eliminate the use of signals $-gOs$, $+gOs$ by substituting therein the following equivalents:

$$-gOs=(+Os).K'+(-Os).K$$
$$+gOs=(+Os).K+(-Os).K'$$

This provides the following set of logic:

$$\begin{aligned}-Coo&=Roo'.[(-Os).Fc+(+Os).Fc+(+Os).K'.Fi+(-Os).K.Fi]\\&=Roo'.[(-Os).(Fc+K.Fi)+(+Os).(Fc+K'.Fi)]\\&=Roo'.[(-Os).(Ro'.Co+K.Ro.Co+K.Ro'.Co')+(+Os).(Ro.Co'+K'.Ro.Co+Ro'.Co')]\\&=Roo'.\{(-Os).[Co.(Ro'+K)+K.Ro']+(+Os).[Co'.(Ro+K')+Ro.K']\}\\+Coo&=Roo'.[(-Os).Fc+(+Os).Fe+(+Os).K.Fi+(-Os).K'.Fi]\\&=Roo'.[(-Os).(Fc+K'.Fi)+(+Os).(Fe+K.Fi)]\\&=Roo'.[(-Os).(Ro.Co'+K'.Ro.Co+Ro'.Co)+(+Os).(Ro'.Co+K.Ro.Co+K.Ro'.Co')]\\&=Roo'.\{(-Os).[Co'.(Ro+K')+Ro.K']+(+Os).[Co.(Ro'+K)+Ro'.K]\}\end{aligned}$$

The output digit functions are quite simple since the three possibilities of plus, minus, and zero are functions of the signals $-gOs$, $+gOs$, and $N$, respectively, and may be expressed as follows:

$$+Q=(-gOs).N'$$
$$-Q=(+gOs).N'$$
$$oQ=N$$

These general expressions may be mechanized through the employment of two flip-flops referred to as +Q and −Q, each having a 1- and 0-setting input circuit. The +Q flip-flop is set to 1 whenever signal $-gOs$ appears, to 0 for $+gOs$, and flip-flop −Q is set to 1 whenever a signal $+gOs$ appears and to 0 in response to signal $-gOs$. Both flip-flops are set to 0 in response to signal N indicating the performance of a do nothing operation. This mechanization may be expressed generally as follows:

$$1(+Q)=(-gOs).N'$$
$$0(+Q)=(+gOs)+N$$
$$1(-Q)=+gOs).N'$$
$$0(-Q)=(-gOs)+N$$

Provision must also be made, in a manner well known in the art, for shifting the output digits as formed into the output digit register. Furthermore, the plus and minus digits of the function may be combined during a subsequent period by shifting them in the opposite direction and passing them through a subtracter to form the difference between the negative digits and the positive digits.

The general form of a network suitable for producing signals $1Roo$, $oRoo$, $+Coo$, and $-Coo$ is shown in FIG. 15, the general mechanization of which should be apparent from previous examples.

A simplification is possible in certain arithmetic unit places due to various assumptions which may be made. For example, the assumption that A1=1 allows the simplification of the network producing signal $Ro$ to the following:

$$\text{to } Ro=N'.R1'.C1'+R1.C1+N.R1$$

The observation that no carry signals may exist in the formation of signals $Rn-1$ and $Rn-2$ allows the simplification of these terms to the following:

$$\text{to } Rn-2=N'.Rn-1'.An-1+Rn-1.An-1'+N.Rn-1$$
$$\text{to } Rn-1=N'.Rn'.An+Rn.An'+N.Rn$$

In a similar manner, the carry signals $Cn-2$ and $Cn-3$ may be simplified by noting that no previous arithmetic units produce carries for these places, although signal $Cn-3$ receives the previous carry signal $Cn-2$ during the do nothing operation. These observations provide the following functions:

$$\text{to } Cn-3=N'.K'.Rn-1+N'.Rn-1'.An-1+N.Cn-2$$
$$\text{to } Cn-2=N'.K'.Rn+N'.Rn'.An$$

A complete summary of one set of algebra required to define the above-described division system will now be presented, it being understood that many other variations are possible.

SUMMARY OF ALGEBRA $$N=(Ro.Co+Ro'.Co').(Rl.Cl+Rl'.Cl')Roo'$$

$$\text{to } (-Os)=(+Coo).Roo+Roo'.[(-Os).(Ro.Co'+Ro.Cl'+Co.Cl')+(+Os).(Ro'.Co+Ro'.Cl+Co.Cl)]$$

$$1Os=(-gOs).N'$$
$$oOs=(-gOs)'.N'$$
$$(-gOs)'=(+gOs)$$

$$K=Roo.[(-Os).(+Coo)+(+Os).(-Coo)]+Roo'.(Ro.Co'+Ro.Cl'+Co'.Cl')$$

$$1(+Q)=(-gOs).N'$$
$$o(+Q)=(+gOs)+N$$
$$1(-Q)=(+gOs).N'$$

$$o(-Q)=(-gOs)+N$$

$$lRoo=N'.Roo'.[K.(Ro'+Co).(Rl'+Cl)+K'(Ro+Co').(Rl+Cl')]+Ro.Co'.(N+Roo'.Rl.Cl'+Roo'.K')+Ro'.Co.(N+Roo'.Rl'.Cl+Roo'.K)$$

$$oRoo=N'.[K'.Ro.Co'.(Rl+Cl')+K.Ro'.Co.(Rl'+Cl)]$$
$$\text{to } Ro=N'.Rl'.Cl'+Rl.Cl+N.Rl$$

$$\underline{j=2 \text{ to } j=(n-1)}$$

$$\text{to } Rj-1=[Rj.Cj'.Aj'+Rj'.Cj.Aj'+Rj'.Cj'.Aj+Rj.Cj.Aj].N'+N.Rj$$
$$=RjCj'Aj'+N'Rj'(CjAj'+Cj'Aj)+RjCjAj+NRj$$

$$\text{to } Rn-2=N'.Rn-1'.An-1+Rn-1.An-1'+N.Rn-1$$

$$\text{to } Rn-1=N'.Rn'.An+Rn.An'+N.Rn$$

to $Rn$=Set to zero at beginning of operation or shift in least significant half of double length dividend.

$$lCoo=-Coo=Roo'.[(-Os).Ro'.Co+(-Os).Ro.Co'+(-gOs).(Ro.Co+Ro'.Co')]$$

$$oCoo=+Coo=Roo'.[(-Os).Ro.Co'+(+Os).Ro'.Co+(+gOs).(Ro.Co+Ro'.Co')]$$

$$\underline{j=2 \text{ to } j=n-2}$$

$$\text{to } Cj-2=[K.(Rj'.Cj+Rj'.Aj+Cj.Aj)+K'.(Rj.Cj^1+Rj.Aj+Cj'.Aj)].N'+N.Cj-1$$

$$\text{to } Cn-3=N'.K'.Rn-1+N'.Rn-1'.An-1+N.Cn-2$$
$$\text{to } Cn-2=N'.K'.Rn+N'.Rn'.An$$

From the foregoing description, it should now be apparent that the present invention provides a simple and effective method for utilizing a plurality of arithmetic units for forming result and carry signals of opposite sign without cascaded carries to perform division, and other similar operations without the complex decision logic which would otherwise be required in accordance with previously known techniques.

The invention thus provides a high-speed system wherein $n$ output digits may be formed during $n$ successive digit time intervals without the usual delay for cascading carries, but yet without any substantial increase in complexity over existing systems as to the decision logic involved.

The basic concept of performing three operations of addition, subtraction, and do nothing should now be understood, these operations being indicated by the signals $+gOs$, $-gOs$, and N, respectively. It has been pointed out that as these basic signals are formed, output quotient digits −Q, +Q, and 0Q are formed, respectively.

A novel technique for modifying the result and carry digits in certain of the most significant digit positions has also been considered herein. In accordance with this approach the most significant remainder digit is produced as a complete entity and the sign thereof is indicated instead of a carry. Thus signals $Roo$ and $Coo$ in the particular system illustrated represent a complete result digit and the sign thereof rather than the usual partial result and carry signal. This technique also contributes toward the relatively simple logic which is possible.

As heretofore explained, the remainder digits are always shifted during a "do nothing" operation. Furthermore, as successive digits are computed, they are entered into a succeeding digit place to correspond to the shift in the "do nothing" operation. However, it is to be understood that the actual or effectual shift of the partial remainder is not necessary and the invention may be performed otherwise. Specifically, the input number may be shifted in the opposite direction and the same effect may thereby be produced.

I claim:

1. A device for forming output digit signals representing a function by combining first and second series of operand signals in addition or subtraction to form a first partial remainder, comprising a series of digits, successive partial remainders being then each formed as a function of the status of the previously formed partial remainder, the status of each partial remainder also determining the manner of producing an output digit signal, said device comprising: first means for generating separate series of partial result and carry digit signals, said digit signals having values in respective binary digital places such that a remainder corresponding to their combined values may be determined by combining the signals in each digital place considering respective digits to be of opposite signs, all of said partial result digit signals being considered to be of one sign and all of said partial carry digit signals being considered to be of a sign opposite to said one sign, said digit signals being generated as a function of the previous result and carry digit signals in the same binary digital place, and the corresponding digit signal in the same place of the first operand; second means for producing operation control signals as a function of the predetermined set of the most significant result and carry digit signals, said operation control signals including a plus control signal to indicate that the next operation should be addition, a minus control signal to indicate that the next operation should be subtraction, and a zero control signal indicating that said predetermined set of most significant result and carry digit signals represent a zero value; third means responsive to said operation control signals for forming a plus output digit signal and subtracting the first operand in response to said minus control signal, for forming a minus output digit signal and adding the first operand in response to said plus control signal, and for forming a zero output digit signal in response to said zero control signal.

2. A device for performing division, and other arithmetic operations wherein a first operand is to be subtracted from a second operand to form a first partial remainder, successive partial remainders being formed by combining successive first operands with previous partial remainders in accordance with the algebraic magnitude of the previous partial remainder, output digit signals being formed as a function of the algebraic magnitude of respective partial remainders, said device comprising: first means for producing each partial remainder as a series of individually corresponding partial result and carry digit signals, occupying respective binary digital places, such that the complete result of the partial remainder may be determined by combining partial result and carry digit signals, considering them to be of opposite sign, and considering the sign of the carry digit signals to be the same as that of the previous operation, subtraction corresponding to a negative sign and addition corresponding to a positive sign, the partial carry digit signals bearing the sign of the respective previous operations; second means for generating a signal representing the operation sign as a function of a predetermined set of the most significant result in carry digit signals; third means for forming new result and carry signals as the function of the present and previous operation sign signals produced by said second means whenever the sign of the partial remainder may be detected in said most significant result and carry digit signals; fourth means for retaining the result and carry digit signals without modification whenever the sign of the partial remainder cannot be detected; fifth means for producing plus and minus output digit signals, respectively, whenever the operation sign signal represents a minus and plus operation, respectively; and sixth means for producing a zero output digit signal whenever the sign of the partial remainder cannot be detected in said predetermined set of signals.

3. An arrangement for generating signals representing the digits of an output number Q as a function of the algebraic magnitude of the combination of a predetermined set of the most significant digit signals of successive remainders, the first remainder being formed by combining the digit signals $Aj$ of a first operand with the corresponding digit signals $Rj$ of the second operand, "$j$" representing the respective binary digital places of each digit signal, successive remainders being formed as respective functions of the predetermined set of digits of the previous remainder, said arrangement comprising: first means for formulating each high place result digit signal $Rj-1$, and each higher place carry digit signal $Cj-2$, in the remainder, as a function of the previously formed digit signals $Rj$, and $Cj$, and the corresponding first operand digit signal $Aj$, whenever the binary value of the predetermined set of most significant digit signals may be detected, the digit signals $Rj-1$ and $Cj-2$ having values such that a complete remainder value may be determined therefrom by assuming all partial carry digit signals to have an algebraic sign the same as that of the previous operation sign considering addition and subtraction to be positive and negative, respectively, and considering all of the partial result digit signals to have an opposite sign thereto; second means for forming operation sign signals $-gOs$ and $+gOs$ when the binary value of said predetermined set of most significant digit signals is positive and negative, respectively; third means for forming a signal N whenever the sign of the magnitude of the predetermined set of most significant digits cannot be detected; and fourth means for producing output digit signals $+Qj$, $-Qj$, and $OQj$ whenever signals $-gOs$, $+gOs$, and N are formed, respectively.

4. A device for producing output digit signals representing a predetermined function of first and second operands, where the first operand may constitute a variable, said device comprising: first means for subtracting the first operand from the second operand to form a first remainder and a plus first output digit signal; second means for forming successive remainders by detecting a predetermined set of the most significant digit signals of each remainder and by combining the first operand with each remainder to form the new remainder by adding and subtracting, respectively, when the predetermined set of digits indicate negative and positive remainders, minus and plus output digit signals being formed, respectively; third means for shifting the remainder to form the next remainder whenever the predetermined set of digits indicates a zero remainder; and fourth means for producing zero output digits each time the remainder is shifted without modification.

5. A device for performing division and other similar operations at high speed without the necessity of an accumulated register with cascaded carrys, said device comprising: first means for performing a series of successive remainders by combining an input operand with a previous remainder by addition or subtraction whenever a predetermined set of the most significant digit signals of the previous remainder indicate the remainder to be negative and positive, respectively; second means for forming plus and minus output digit signals when operations of subtraction and addition are performed to form the new remainder; and third means for producing a zero output digit signal when neither addition nor subtraction is performed.

6. A device for controlling the operation of a series of arithmetic units individually operable to combine an input digit signal and previous result and carry digit signals in the same binary digital place to form a new result digit signal for the next higher place and a carry digit signal for a binary position two places higher, to perform high-speed addition and other similar operations, said device comprising: first means for operating the units to combine the input digit signals by addition and subtraction, respectively, to form a new remainder comprising a series of result and carry digit signals, whenever a predetermined set of the most significant digit signals of the present remainder indicate negative and positive values therein, respectively; second means for forming plus and minus output digit signals when operations of subtraction and addition are performed, respectively; and third means for producing a zero output digit signal when no sign is indicated in said predetermined set of signals and neither the operations of addition nor subtraction are performed.

7. In a computing system including an accumulator register comprising a plurality of partial result signal storage stages and a corresponding plurality of partial carry signal storage stages, the position of each pair of stages in the register, one partial result storage stage and one corresponding partial storage stage, constituting a different binary place, and the on or off state of the signals stored in a binary place representing, together, a total binary value for the binary place, the total representation of all values in said binary places constituting a binary number; an arrangement for combining input signals with partial result and partial carry signals stored in said register to produce a series of partial remainders, the arrangement permitting the formation of each partial remainder without the necessity for cascading carries throughout said register while permitting the production of a series of output digit signals representing the operations performed to generate said series of remainders, without any delay for carry cascading, said arrangement comprising: first means, coupled to the storage stages in said register producing signals representing the most significant digital portion of each remainder stored in said register, for producing first, second, and third control signals, the first control signal indicating the presence of a positive remainder in said register, the second control signal indicating the presence of a negative remainder in said register, and the third control signal indicating a zero condition in the most significant digital portion of said remainder; second means, responsive to said first control signal for subtracting the input signals from the remainder in said register to form the new partial result and partial carry signal constituting the new remainder, said second means being responsive to said second control signal for adding the input signals to the remainder to form the new partial result and partial carry signals, and being responsive to said third control signal to produce said new partial result and partial carry signals as equal to the previous corresponding signals, without modification; third means for entering the partial result and partial carry signals produced by said second means into appropriate result and carry signal storage stages so that each remainder is effectively advanced one binary digital position with respect to the input signals after each operation of said third means; and fourth means for producing output digits of plus one, minus one, and zero in response to said first, second, and third control signals, respectively.

8. In an arithmetic system wherein a plurality of units are employed to produce and store partial result and partial carry signals, each unit including partial result and partial carry storage devices for retaining signals previously produced, and being adapted to receive a respective binary input signal constituting part of a divisor, the binary weight of the input signal corresponding to the weight of the stored signals in said devices, a control circuit for actuating said units to perform division wherein said divisor is represented by input signals A*l* . . . A*j* . . . A*n*, signal A*l* representing the most significant binary digit of the divisor and signal A*n* representing the least significant digit of the divisor, the dividend for the operation being entered into the partial result storage devices of said units to constitute the first partial remainder, each subsequent partial remainder being formed as separate partial result and carry signal series R*o*, R*l* . . . R*j* . . . R*n*, and C*o* . . . C*j* . . . C*n*−2, respectively, where R*o* and C*o* are the most significant partial result and partial carry signals and signals R*n* and C*n*−2 are the least significant partial result and partial carry signals, said control circuit being operable to cause the formation of *n* quotient digits Q during *n* successive digit time intervals, said control circuit comprising: a first network *g*O*s* responsive to signals R*o*, C*o* . . . and other signals in a set of a predetermined group of the most significant digit signals produced by said units, to produce signals +*g*O*s* and −*g*O*s* representing control signals for addition and substraction, respectively, for the next combination of the divisor input signals with the stored signals in said units, to produce the next series of partial result and partial carry signals constituting the next partial remainder, said first network being arranged to shift the partial remainder signals in binary position to respective one-digit higher positions for storage in said units; a second network for receiving and storing signals +*g*O*s* and −*g*O*s* to produce stored signals corresponding thereto; a third network, including a control element K, for actuating said units to produce first and second carry signals when the output signals produced by said first and second networks represent the same and different operation signs, respectively, and a second control element for producing a signal N to actuate said units to produce new partial remainder signals equal to the then stored signals, respectively, without modification, whenever said group of the most significant digit signals including R*o*, C*o* . . . indicate that the most significant part of the partial remainder is zero; and an output network *g*Q for producing output signals +Q and −Q when operation sign signals −*g*O*s* and +*g*O*s* are produced, respectively, and for producing a zero output digit signal *o*Q in response to signal N.

9. In an arithmetic system wherein a plurality of pairs of flip-flops are employed to store partial result and partial carry signals, each pair of flip-flops being arranged to store signals of a different binary place, the binary signal representation of the flip-flops in each place representing a total binary value for the place, and the combined representation of all binary values in all places constituting a stored binary number, the system further including a plurality of units, corresponding to said binary places, respectively, and means for generating plus and minus operation sign signals for controlling the addition and subtraction of input signals through respective units, and means for storing a signal representing the sign of each operation to indicate the signs of all of the new partial carry signals produced; a control circuit for actuating said units to produce successive series of partial result and partial carry signals corresponding to remainders for operations such as division and to produce output signals representing the operations performed by said units, addition being designated by a plus-representing output signal in a representative binary place, subtraction being designated by a minus-representing output signal in a representative binary place, and regeneration of the partial result and partial carry signals without modification being designated by a zero output signal in a representative binary place, said control circuit comprising: first means coupled to the units producing at least the highest and next highest binary place partial result and partial carry signals for producing input signals for said means for generating said plus and minus operation sign signals; second means coupled to the units producing at least the highest and next highest binary place partial result and partial carry signals for producing a do nothing control signal for regenerating partial result and partial carry signals without modification; third means for entering the new partial result and partial carry signals produced by said units, under control of said operation sign signals and said do nothing control signal, into said flip-flops so that total binary number represented by the new partial result and partial carry signals is shifted to a one binary digit higher position after each operation; and output means for producing the plus, minus, and zero representing output signals in response to said plus operation sign signal, said minus operation sign signal, and said do nothing control signal, respectively.

10. In a computing system including first and second series of bistable elements for storing corresponding series of binary partial result and partial carry signals, each pair of bistable elements being arranged to correspond to a different binary place of a number, the binary representation of both elements constituting a pair indicating the binary digit value for the particular place, the combination of all binary digit values in all places constituting the binary number, a combination for operating said bistable elements to store successive remainders for a division operation, said combination comprising: first means for receiving input signals representing a dividend and for entering the dividend input signals into respective partial result storing bistable elements to constitute the first partial remainder for division, said first means being thereafter operable to enter successive partial remainder signals into said partial result and partial carry bistable elements so as to shift the partial remainders one binary position following each operation; second means coupled to at least two pairs of said bistable elements in the most significant binary places, for producing first, second, and third operation control signals, said first operation control signal indicating the positive condition of the partial remainder, said second operation control signal indicating the negative condition of the partial remainder, and the third operation control signal indicating a zero condition in the most significant portion of the remainder; third means responsive to said first operation control signal for combining divisor input signals with the partial remainder stored in said bistable elements by subtraction, responsive to said second operation control signal for combining divisor input signals with the partial remainder stored in said bistable elements by addition, and responsive to said third operation control signal for producing new partial result and partial carry signals without modification of the signals then stored in said bistable elements; and fourth means for producing quotient output signals as +1, −1, and 0 in response to said first, second and third control signals, respectively.

11. In combination with an accumulator register comprising a plurality of result signal storage devices and a corresponding plurality of carry signal storage devices, the position of each pair of devices in the register constituting a different binary place, the states of the pair of devices together constituting a total binary value for the place; a system for performing division or other similar operations by combining first operand signals A*l* . . . A*j* . . . A*n* in response to operation sign control signals, with partial remainder signals stored in said devices to produce new partial result signals R*o*, R*l* . . . R*n* to be stored in respective devices and new partial carry signals C*o*, C*l* . . . C*n*−2 to be stored in respective devices, the combination of new partial result and new partial carry signals constituting the new partial remainder, said system comprising: a network *g*O*s* responsive to signals R*o*, C*o*, R*l*, and C*l* for producing operation sign signals +*g*O*s* and −*g*O*s*; an operation sign storage device for receiving and storing said signals +*g*O*s* and −*g*O*s* and for producing stored signals +O*s* and −O*s*, respectively; a control device K responsive to said stored signals +O*s* and −O*s* and to signals R*o*, C*o*, R*l*, and C*l* for producing complementary control signals K and K′, indicating like and unlike sign representation by said operation sign signals and said stored signals, respectively; a control device N for detecting the zero-representing condition of signals R*o*, C*o*, R*l*, and C*l* and for producing signals N and N′ indicating the zero and non-zero condition thereof, respectively; a plurality of arithmetic units for producing said partial result and partial carry signals, each unit including first and second carry circuits responsive to signals K and K′, respectively; a network for producing complementary signals R*oo* and R*oo*′ representing a complete most significant result digit and complementary signals C*oo* and C*oo*′ representing the sign thereof, in response to signals N, K, R*o*, C*o*, R*l*, and C*l* and their respective complements; and an output network *g*Q for producing signals +Q, −Q, and *o*Q representing plus, minus, and zero quotient digits in response to signals −*g*O*s*, +*g*O*s*, and N, respectively.

12. The system defined in claim 11, where the plus sign (+) represents the logical inclusive "or" function, the dot (.) represents the logical "and" function, the prime (′) represents the complement of a signal, and the entire equation indicates the conditions for producing a binary one representing signal wherein said network for producing signal N is generally mechanized in accordance with the following function:

$$N=(Ro.Co+Ro'.Co').(Rl.Cl+Rl'.Cl').Roo'$$

where the dot (.) represents the logical "and," the plus (+) represents the logical inclusive "or," and the prime (′) represents the complementary state of the respective signal.

13. The system defined in claim 11, where the plus sign (+) represents the logical inclusive "or" function, the dot (.) represents the logical "and" function, the prime (′) represents the complement of a signal, and the entire equation indicates the conditions for producing a binary one representing signal wherein said network for generating the signals +*g*O*s* and −*g*O*s* is generally mechanized as follows:

$$1(-Os)=(+Coo).Roo+Roo'.(Ro'.Co+Ro'.Cl+Co.Cl)$$

$$o(-Os)=(-Coo).Roo+Roo'.(Ro'.Co+Ro'.Cl+Co.Cl)$$

where the dot (.) represents the logical "and," the plus (+) represents the logical inclusive "or," and the prime (′) represents the complementary state of the respective signal.

14. The system defined in claim 11, where the plus sign (+) represents the logical inclusive "or" function, the dot (.) represents the logical "and" function, the prime (′) represents the complement of a signal, and the entire equation indicates the conditions for producing a binary one representing signal wherein the network for producing signal K is generally mechanized as follows:

$$K=(-gOs).(-Os)+(+gOs).(+Os)$$

$$K=Roo.[(-Os).(+Coo)+(+Os).(-Coo)]+Roo'.(Ro.Co'+Ro.Cl'+Co'.Cl')$$

where the dot (.) represents the logical "and," the plus (+) represents the logical inclusive "or," and the prime (′) represents the complementary state of the respective signal.

15. The system defined in claim 11, where the plus sign (+) represents the logical inclusive "or" function, the dot (.) represents the logical "and" function, the prime (′) represents the complement of a signal, and the entire equation indicates the conditions for producing a binary one representing signal wherein the network for producing signal R*oo* is generally mechanized as follows:

$$1Roo=N'.Roo'.[K.(Ro'+Co).(Rl'+Cl)+K'.(Ro+Co').(Rl+Cl')]+Ro.Co'.(N+Roo'.Rl.Cl'+Roo'.K')+Ro'.Co.(N+Roo'.Rl'.Cl+Roo'.K)$$

$$oRoo=N'.[K'.Ro.Co'.(Rl+Cl')+K.Ro'.Co.(Rl'+Cl)]$$

where the dot (.) represents the logical "and," the plus (+) represents the logical inclusive "or," and the prime (′) represents the complementary state of the respective signal.

16. The system defined in claim 11, where the plus sign (+) represents the logical inclusive "or" function, the dot (.) represents the logical "and" function, the prime (′) represents the complement of a signal, and the entire equation indicates the conditions for producing a binary one representing signal wherein $Coo$ is defined as follows:

$$-Coo=Roo'.[(-Os).Ro'.Co+(+Os).RoCo'+(-gOs).(Ro.Co+Ro'.Co']$$
$$=Roo'.(-Os).[Co.(Ro'+K)+K.Ro']+(+Os).[Co'.(Ro+K')+Ro.K']$$

$$+Coo=Roo'.[(-Os).Ro.Co'+(+Os).Ro'.Co+(+gOs).(Ro.Co+Ro'.Co')]$$
$$=Roo'.(-Os).[Co'.(Ro+K')+Ro.K']+(+Os).[Co.(Ro'+K)+Ro'.K]$$

where the dot (.) represents the logical "and," the plus (+) represents the logical inclusive "or," and the prime (') represents the complementary state of the respective signal.

17. The system defined in claim 11, where the plus sign (+) represents the logical inclusive "or" function, the dot (.) represents the logical "and" function, the prime (') represents the complement of a signal, and the entire equation indicates the conditions for producing a binary one representing signal wherein the lower place partial result digits $Rj-1$ may be defined as follows:

to $Rj-1=[Rj.Cj'.Aj'+Rj'.Cj.Aj'+Rj'.Cj'.Aj+Rj.Cj.Aj].N'+N.Rj$ where the dot (.) represents the logical "and," the plus (+) represents the logical inclusive "or," and the prime (') represents the complementary state of the respective signal.

References Cited in the file of this patent

UNITED STATES PATENTS

| | | |
|---|---|---|
| 2,394,924 | Luhn | Feb. 12, 1946 |
| 2,700,696 | Barker | Jan. 25, 1955 |
| 2,701,095 | Stibitz | Feb. 1, 1955 |
| 2,719,670 | Jacobs et al. | Oct. 4, 1955 |
| 2,775,402 | Weiss | Dec. 25, 1956 |
| 2,799,450 | Johnson | July 16, 1957 |

OTHER REFERENCES

Booth et al.: Automatic Digital Calculators, Academie Press Inc., New York (1953), pp. 47–50.

Weinberger et al.: A One-Microsecond Adder Using One-Megacycle Circuitry, I.R.E. Transactions on Electronic Computers, vol. EC–5, No. 2, June 1956, pp. 65–73.

UNITED STATES PATENT OFFICE

CERTIFICATE OF CORRECTION

Patent No. 3,023,961 March 6, 1962

Roger A. Stafford

It is hereby certified that error appears in the above numbered patent requiring correction and that the said Letters Patent should read as corrected below.

Column 6, line 5, for "Cj-1" read -- Cj-2 --; column 10, line 42, for "referred" read -- referenced --; columns 11 and 12, Example 3, under the column heading "+Q", next to the last digit, for "0" read -- 1 --; same columns, Example 4, under the column heading "7" the last digit "0" should be deleted; column 12, line 70, for "there" read -- therefore --; column 13, line 31, before "sign" insert -- operation --; column 14, line 22, for "+11111" read -- +011111 --; column 15, line 26, for "wheer" read -- where --; column 19, line 56, for "+1" read -- ±1 --; column 21, line 35, for "enclosed" read -- encloses --; column 22, line 23, for "an" read -- a --; column 23, line 18, before "+" insert an opening parenthesis.

Signed and sealed this 12th day of May 1964.

(SEAL)
Attest:

ERNEST W. SWIDER

Attesting Officer

EDWARD J. BRENNER

Commissioner of Patent